(12) United States Patent
Zhang et al.

(10) Patent No.: US 10,944,475 B2
(45) Date of Patent: Mar. 9, 2021

(54) SIGNAL TRANSMITTING METHOD AND APPARATUS, TRANSMITTER, AND SIGNAL TRANSMISSION SYSTEM

(71) Applicant: HUAWEI TECHNOLOGIES CO., LTD., Guangdong (CN)

(72) Inventors: Liang Zhang, Dongguan (CN); Qiang Zhang, Dongguan (CN); Enbo Zhou, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/510,418

(22) Filed: Jul. 12, 2019

(65) Prior Publication Data

US 2019/0334620 A1 Oct. 31, 2019

Related U.S. Application Data

(63) Continuation of application No. PCT/CN2017/071437, filed on Jan. 17, 2017.

(51) Int. Cl.
*H04B 10/04* (2006.01)
*H04B 10/2525* (2013.01)
(Continued)

(52) U.S. Cl.
CPC .......... *H04B 10/2525* (2013.01); *G02F 1/21* (2013.01); *H04L 27/2607* (2013.01); *H04L 27/2628* (2013.01); *G02F 2001/212* (2013.01)

(58) Field of Classification Search
CPC .......... H04B 10/2525; H04B 10/2507; H04B 10/2575; H04B 10/27; H04B 10/548;
(Continued)

(56) References Cited

U.S. PATENT DOCUMENTS

| 4,896,287 A | * | 1/1990 | O'Donnell | G06F 7/4812 |
| | | | | 708/622 |
| 5,757,862 A | * | 5/1998 | Ishizu | H04L 27/2331 |
| | | | | 329/304 |

(Continued)

FOREIGN PATENT DOCUMENTS

| CN | 1972161 A | 5/2007 |
| CN | 101622845 A | 1/2010 |

(Continued)

OTHER PUBLICATIONS

Extended European Search Report issued in European Application No. 17892294.4 dated Nov. 26, 2019, 9 pages.

(Continued)

*Primary Examiner* — Hibret A Woldekidan
(74) *Attorney, Agent, or Firm* — Fish & Richardson P.C.

(57) ABSTRACT

This application relates to the communications field, and discloses a signal transmitting method and apparatus, a transmitter, and a signal transmission system. An example method includes: generating a real-number-type signal; performing phase rotation processing on the real-number-type signal to obtain a complex-number-type signal, where a value of a real part signal of the complex-number-type signal is equal to a value of an imaginary part signal of the complex-number-type signal; and transmitting the complex-number-type signal to a receiver.

15 Claims, 17 Drawing Sheets

(51) Int. Cl.
*G02F 1/21* (2006.01)
*H04L 27/26* (2006.01)

(58) Field of Classification Search
CPC .............. H04B 10/614; H04B 10/6166; H04B 10/5055; H04B 10/50; H04B 10/505; H04B 10/588; H04B 10/5561; H04B 10/50572; H04B 10/50575; H04B 10/50593; H04B 10/50595; H04B 10/58; H04B 10/613; G02F 1/21; G02F 2001/212; H04L 27/2607; H04L 27/2628; H04L 27/2649; H04L 27/2697; H04L 27/2627; H04J 14/06
USPC .... 398/188, 193, 194, 141, 28, 29, 182, 183
See application file for complete search history.

(56) References Cited

U.S. PATENT DOCUMENTS

| | | | | |
|---|---|---|---|---|
| 7,236,543 | B2* | 6/2007 | Wang | H04L 25/03859 332/103 |
| 8,983,309 | B2* | 3/2015 | Harley | H04B 10/5561 398/206 |
| 9,749,047 | B2* | 8/2017 | Han | H04B 10/2507 |
| 2003/0031284 | A1 | 2/2003 | Ishida et al. | |
| 2005/0008045 | A1 | 1/2005 | Xie et al. | |
| 2007/0058741 | A1* | 3/2007 | Inagawa | H04L 27/0008 375/260 |
| 2007/0122161 | A1 | 5/2007 | Charlet et al. | |
| 2008/0166985 | A1 | 7/2008 | Wortel et al. | |
| 2013/0077979 | A1 | 3/2013 | Dou et al. | |
| 2013/0336654 | A1* | 12/2013 | Arikawa | H04J 14/06 398/65 |
| 2014/0199074 | A1* | 7/2014 | Cho | H04L 27/2697 398/79 |
| 2016/0216720 | A1* | 7/2016 | Kimura | G06G 7/163 |

FOREIGN PATENT DOCUMENTS

| | | | |
|---|---|---|---|
| CN | 103873424 A | * | 6/2014 |
| CN | 103873424 A | | 6/2014 |
| CN | 105530054 A | | 4/2016 |

OTHER PUBLICATIONS

PCT International Search Report and Written Opinion issued in International Application No. PCT/CN2017/071437 dated Oct. 24, 2017, 16 pages (with English translation).

Inoue et al., "Dispersion pre-compensation for PAM transmission system using 1-sample/symbol DAC and IQ modulator," 2015 Optical Fiber Communications Conference and Exhibition (OFC), Jun. 15, 2015, 3 pages.

Office Action issued in Chinese Application No. 201780083698.X dated Apr. 24, 2020, 19 pages (with English translation).

* cited by examiner

SIGNAL TRANSMITTING METHOD AND APPARATUS, TRANSMITTER, AND SIGNAL TRANSMISSION SYSTEM

CROSS-REFERENCE TO RELATED APPLICATIONS

This application is a continuation of International Application No. PCT/CN2017/071437, filed on Jan. 17, 2017, the disclosure of which is hereby incorporated by reference in its entirety.

TECHNICAL FIELD

This application relates to the communications field, and in particular, to a signal transmitting method and apparatus, a transmitter, and a signal transmission system.

BACKGROUND

With development of the times, increasingly more communications technologies are applied to people's life. For example, a transmitter held by a user 1 can generate a transmission signal, and transmit, through an optical fiber, the transmission signal to a receiver held by a user 2, to implement communication between the user 1 and the user 2.

In a related technology, a transmitter may generate a real-number-type signal, and transmit the generated real-number-type signal to a receiver through an optical fiber. When the real-number-type signal is propagated in the optical fiber, the real-number-type signal is converted into a complex-number-type signal, so that a signal finally received by the receiver is a complex-number-type signal. In addition, a real part signal of the complex-number-type signal is related to the real-number-type signal sent by the transmitter, and an imaginary part signal of the complex-number-type signal is unrelated to the real-number-type signal sent by the transmitter. Further, after receiving the complex-number-type signal, the receiver needs to perform power detection on both the real part signal and the imaginary part signal of the complex-number-type signal, and then determines power of the received complex-number-type signal based on a power detection result of the real part signal and a power detection result of the imaginary part signal.

In the related technology, the imaginary part signal of the complex-number-type signal is unrelated to the real-number-type signal sent by the transmitter, and energy waste is caused during power detection performed by the receiver on the imaginary part signal of the complex-number-type signal. Consequently, an energy waste rate of the receiver during the power detection is relatively high.

SUMMARY

To resolve a problem of a relatively high energy waste rate of a receiver during power detection, this application provides a signal transmitting method and apparatus, a transmitter, and a signal transmission system. Technical solutions are as follows:

According to a first aspect, a signal transmitting method is provided, and is applied to a signal transmitting apparatus. The method includes:

generating a real-number-type signal;

performing phase rotation processing on the real-number-type signal to obtain a complex-number-type signal, where a value of a real part signal of the complex-number-type signal is equal to a value of an imaginary part signal of the complex-number-type signal; and transmitting the complex-number-type signal to a receiver through an optical fiber.

After the real-number-type signal is generated, the phase rotation processing is further performed on the real-number-type signal to obtain the complex-number-type signal, so that a signal sent to the receiver through the optical fiber is the complex-number-type signal. In addition, a signal type of the complex-number-type signal does not change during transmission in the optical fiber, and both the real part signal and the imaginary part signal in the complex-number-type signal received by the receiver are related to a signal transmitted by a transmitter, so that no energy waste is caused during power detection performed by the receiver on both the received real part signal and the received imaginary part signal. Therefore, an energy waste rate of the receiver during the power detection is reduced.

Optionally, the signal transmitting apparatus includes a service data source, a phase rotator, and an electro-optic modulator that are connected in series, where the generating a real-number-type signal includes:

generating the real-number-type signal by using the service data source;

the performing phase rotation processing on the real-number-type signal to obtain a complex-number-type signal includes:

performing the phase rotation processing on the real-number-type signal by using the phase rotator, to obtain the complex-number-type signal, where the value of the real part signal of the complex-number-type signal is equal to the value of the imaginary part signal; and the transmitting the complex-number-type signal to a receiver through an optical fiber includes:

transmitting the complex-number-type signal to the receiver by using the electro-optic modulator through the optical fiber.

Optionally, the signal transmitting apparatus further includes a dispersion pre-compensator that is serially connected between the phase rotator and the electro-optic modulator, and the dispersion pre-compensator includes a fast Fourier transformation FFT module, a dispersion pre-compensation module, and a first inverse fast Fourier transformation IFFT module that are connected in series;

before the transmitting the complex-number-type signal to the receiver by using the electro-optic modulator through the optical fiber, the method further includes:

performing FFT processing on the complex-number-type signal by using the FFT module;

performing, by using the dispersion pre-compensation module, dispersion pre-compensation processing on the complex-number-type signal on which the FFT processing has been performed; and performing, by using the first IFFT module, first IFFT processing on the complex-number-type signal on which the dispersion pre-compensation processing has been performed; and the transmitting the complex-number-type signal to the receiver by using the electro-optic modulator through the optical fiber includes:

transmitting, to the receiver by using the electro-optic modulator through the optical fiber, the complex-number-type signal on which the first IFFT processing has been performed.

The service data source, the phase rotator, and the dispersion pre-compensator in this application may constitute a transmit DSP unit. The dispersion pre-compensator in the transmit DSP unit can perform dispersion pre-compensation on a signal that needs to be sent by the transmitter, to compensate the signal for dispersion occurring in an optical fiber, to ensure that a signal received by the receiver is relatively consistent with the signal sent by the transmitter.

Optionally, the electro-optic modulator includes a dual-output digital-to-analog converter DAC and a double-sideband modulation module that are connected in series, and the transmitting the complex-number-type signal to the receiver by using the electro-optic modulator through the optical fiber includes:

processing the complex-number-type signal by using the dual-output DAC, to obtain the real part signal and the imaginary part signal of the complex-number-type signal;

transmitting the real part signal and the imaginary part signal to the double-sideband modulation module by using the dual-output DAC through two output ends of the dual-output DAC;

performing modulation processing on the real part signal and the imaginary part signal by using the double-sideband modulation module, to obtain a double-sideband complex-number-type signal; and transmitting the double-sideband complex-number-type signal to the receiver by using the double-sideband modulation module through the optical fiber.

In other words, the electro-optic modulator in the transmitter includes the dual-output DAC and the double-sideband modulation module. The signal sent by the transmitter is a DSB signal, and a signal-to-noise ratio of the DSB signal is greater than a signal-to-noise ratio of an SSB signal sent by a transmitter in a related technology. Therefore, in this application, the signal transmitted by the transmitter to the receiver has relatively good quality.

The double-sideband modulation module in this application may be an IQMZM or a DDMZM.

Optionally, the double-sideband modulation module is an IQ Mach-Zehnder modulator IQMZM, and the IQMZM includes a first Mach-Zehnder modulator MZM, a second MZM, and a third MZM;

the two output ends of the dual-output DAC are serially connected to the first MZM and the second MZM, the first MZM and the second MZM are connected in parallel, both the first MZM and the second MZM are serially connected to the third MZM, and the third MZM is connected to the receiver through an optical fiber; and all of a bias amount of a bias end of the first MZM, a bias amount of a bias end of the second MZM, and a bias amount of a bias end of the third MZM are $$\frac{\pi}{4}.$$

Optionally, the double-sideband modulation module is a dual-driver Mach-Zehnder modulator DDMZM, and the DDMZM includes a first phase modulator PM and a second PM;

the two output ends of the dual-output DAC are serially connected to the first PM and the second PM, the first PM and the second PM are connected in parallel, and both the first PM and the second PM are connected to the receiver through an optical fiber; and both a bias amount of a bias end of the first PM and a bias amount of a bias end of the second PM are $$\frac{\pi}{4}.$$

Optionally, at least one of a linear driving amplifier and an attenuator is serially connected between each of the output ends and a modulator that is serially connected to the output end. A signal is processed by using the linear driving amplifier and the attenuator, so that a signal-to-noise ratio of the signal can be improved, thereby improving signal quality.

Optionally, the service data source includes a pseudo-random binary sequence (PRBS) signal generation module, a mapping module, a series/parallel conversion module, a zero-fill module, a p-point IFFT module, a cyclic prefix adding module, and a parallel/series conversion module that are connected in series, where p is 2 raised to the power of q, and q is an integer greater than or equal to 1; and the generating the real-number-type signal by using the service data source includes:

generating 2m×n PRBS signals by using the PRBS signal generation module, where both m and n are integers greater than or equal to 1;

performing mapping processing on the 2m×n PRBS signals by using the mapping module, to obtain mapping signals;

performing series/parallel conversion processing on the mapping signals by using the series/parallel conversion module, to obtain 2m frequency-domain signals, where the 2m frequency-domain signals include m positive-frequency signals and m negative-frequency signals, and each of the m positive-frequency signals is conjugate to one of the m negative-frequency signals;

performing zero-fill processing on the 2m frequency-domain signals by using the zero-fill module, to obtain p frequency-domain signals;

performing p-point IFFT processing on the p frequency-domain signals by using the p-point IFFT module, to obtain p time-domain signals;

adding a cyclic prefix to the p time-domain signals by using the cyclic prefix adding module, to obtain an anti-dispersion signal; and performing parallel/series conversion processing on the anti-dispersion signal by using the parallel/series conversion module, to obtain the real-number-type signal.

According to a second aspect, a signal transmitting apparatus is provided. The signal transmitting apparatus includes a service data source, a phase rotator, and an electro-optic modulator that are connected in series, where the service data source is configured to generate a real-number-type signal;

the phase rotator is configured to perform phase rotation processing on the real-number-type signal to obtain a complex-number-type signal, where a value of a real part signal of the complex-number-type signal is equal to a value of an imaginary part signal of the complex-number-type signal; and the electro-optic modulator is configured to transmit the complex-number-type signal to a receiver through an optical fiber.

Optionally, the signal transmitting apparatus further includes a dispersion pre-compensator that is serially connected between the phase rotator and the electro-optic modulator, and the dispersion pre-compensator includes an FFT module, a dispersion pre-compensation module, and a first IFFT module that are connected in series, where the FFT module is configured to perform FFT processing on the complex-number-type signal;

the dispersion pre-compensation module is configured to perform dispersion pre-compensation processing on the complex-number-type signal on which the FFT processing has been performed;

the first IFFT module is configured to perform first IFFT processing on the complex-number-type signal on which the dispersion pre-compensation processing has been performed; and the electro-optic modulator is configured to transmit, to the receiver through the optical fiber, the complex-number-type signal on which the first IFFT processing has been performed.

Optionally, the electro-optic modulator includes a dual-output DAC and a double-sideband modulation module that are connected in series, where the dual-output DAC is configured to process the complex-number-type signal to obtain the real part signal and the imaginary part signal of the complex-number-type signal;

the dual-output DAC is further configured to transmit the real part signal and the imaginary part signal to the double-sideband modulation module through two output ends of the dual-output DAC;

the double-sideband modulation module is configured to perform modulation processing on the real part signal and the imaginary part signal to obtain a double-sideband complex-number-type signal; and the double-sideband modulation module is configured to transmit the double-sideband complex-number-type signal to the receiver through the optical fiber.

Optionally, the double-sideband modulation module is an IQMZM, and the IQMZM includes a first MZM, a second MZM, and a third MZM;

the two output ends of the dual-output DAC are serially connected to the first MZM and the second MZM, the first MZM and the second MZM are connected in parallel, both the first MZM and the second MZM are serially connected to the third MZM, and the third MZM is connected to the receiver through an optical fiber; and all of a bias amount of a bias end of the first MZM, a bias amount of a bias end of the second MZM, and a bias amount of a bias end of the third MZM are $$\frac{\pi}{4}.$$

Optionally, the double-sideband modulation module is a DDMZM, and the DDMZM includes a first PM and a second PM;

the two output ends of the dual-output DAC are serially connected to the first PM and the second PM, the first PM and the second PM are connected in parallel, and both the first PM and the second PM are connected to the receiver through an optical fiber; and both a bias amount of a bias end of the first PM and a bias amount of a bias end of the second PM are $$\frac{\pi}{4}.$$

Optionally, at least one of a linear driving amplifier and an attenuator is serially connected between each of the output ends and a modulator that is serially connected to the output end.

Optionally, the service data source includes a PRBS signal generation module, a mapping module, a series/parallel conversion module, a zero-fill module, a p-point IFFT module, a cyclic prefix adding module, and a parallel/series conversion module that are connected in series, where p is 2 raised to the power of q, and q is an integer greater than or equal to 1, where the PRBS signal generation module is configured to generate 2m×n PRBS signals, where both m and n are integers greater than or equal to 1;

the mapping module is configured to perform mapping processing on the 2m×n PRBS signals to obtain mapping signals;

the series/parallel conversion module is configured to perform series/parallel conversion processing on the mapping signals to obtain 2m frequency-domain signals, where the 2m frequency-domain signals include m positive-frequency signals and m negative-frequency signals, and each of the m positive-frequency signals is conjugate to one of the m negative-frequency signals;

the zero-fill module is configured to perform zero-fill processing on the 2m frequency-domain signals to obtain p frequency-domain signals;

the p-point IFFT module is configured to perform p-point IFFT processing on the p frequency-domain signals to obtain p time-domain signals;

the cyclic prefix adding module is configured to add a cyclic prefix to the p time-domain signals to obtain an anti-dispersion signal; and the parallel/series conversion module is configured to perform parallel/series conversion processing on the anti-dispersion signal to obtain the real-number-type signal.

According to a third aspect, a transmitter is provided, and the transmitter includes the signal transmitting apparatus in the second aspect.

According to a fourth aspect, a signal transmission system is provided, and the signal transmission system includes a transmitter, an optical fiber, and a receiver, where the transmitter is the transmitter in the third aspect.

Technical effects obtained in the second aspect to the fourth aspect are similar to technical effects obtained by using a corresponding technical means in the first aspect. Details are not described herein again.

In conclusion, this application provides the signal transmitting method and apparatus, the transmitter, and the signal transmission system. In the signal transmitting method, after the real-number-type signal is generated, the phase rotation processing is further performed on the real-number-type signal to obtain the complex-number-type signal, so that the signal sent to the receiver through the optical fiber is the complex-number-type signal. In addition, the signal type of the complex-number-type signal does not change during transmission in the optical fiber, and both the real part signal and the imaginary part signal in the complex-number-type signal received by the receiver are related to the signal transmitted by the transmitter, so that no energy waste is caused during power detection performed by the receiver on both the received real part signal and the received imaginary part signal. Therefore, the energy waste rate of the receiver during the power detection is reduced.

DESCRIPTION OF EMBODIMENTS

To make the objectives, technical solutions, and advantages of this application clearer, the following further describes the implementations of this application in detail with reference to the accompanying drawings.

Figure 1:
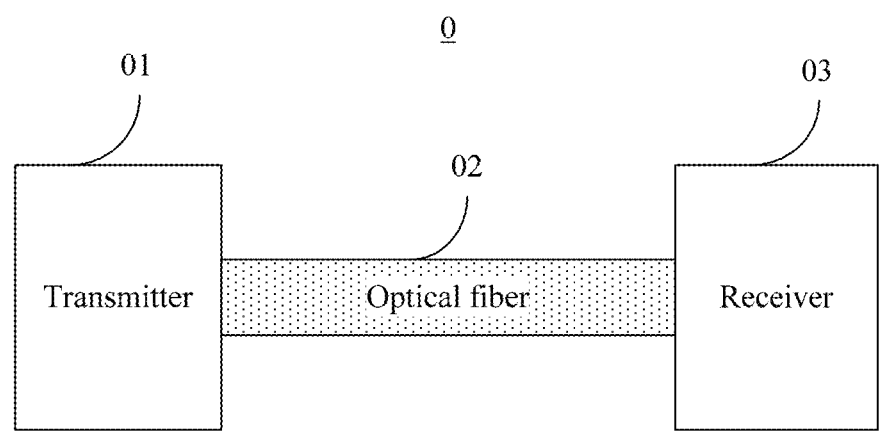
FIG. 1 is a schematic structural diagram of a signal transmission system according to an embodiment of the present application.

FIG. 1 is a schematic structural diagram of a signal transmission system 0 according to an embodiment of the present application. As shown in FIG. 1, the signal transmission system 0 may include a transmitter 01, an optical fiber 02, and a receiver 03, and the transmitter 01 and the receiver 03 establish a communication connection through the optical fiber.

The transmitter 01 may include a signal transmitting apparatus. For a structure of the signal transmitting apparatus, refer to structures shown in FIG. 4 to FIG. 8. An optical fiber amplifier may be disposed in the optical fiber 02. The optical fiber amplifier may be configured to amplify a signal in the optical fiber.

Figure 2:
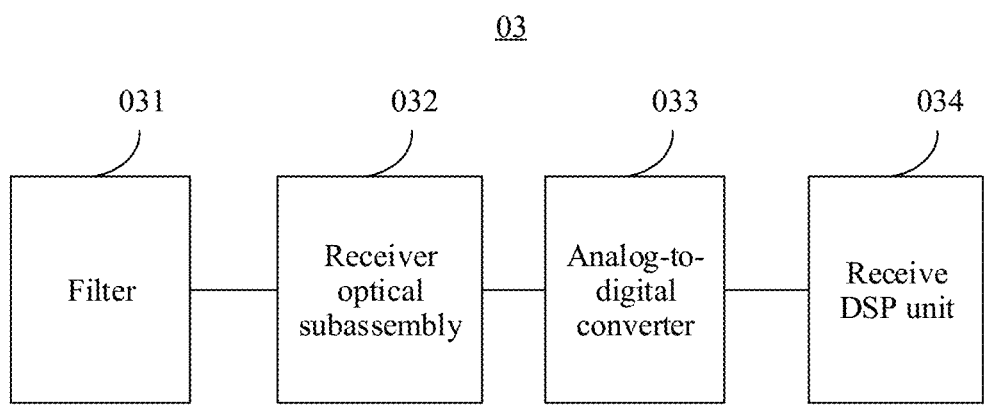
FIG. 2 is a schematic structural diagram of a receiver according to an embodiment of the present application.

FIG. 2 is a schematic structural diagram of a receiver 03 according to an embodiment of the present application. As shown in FIG. 2, the receiver 03 may include a filter 031, a receiver optical subassembly (ROSA) 032, an analog-to-digital converter (ADC) 033, and a receive digital signal processing (DSP) unit 034 that are connected in series.

Figure 3:
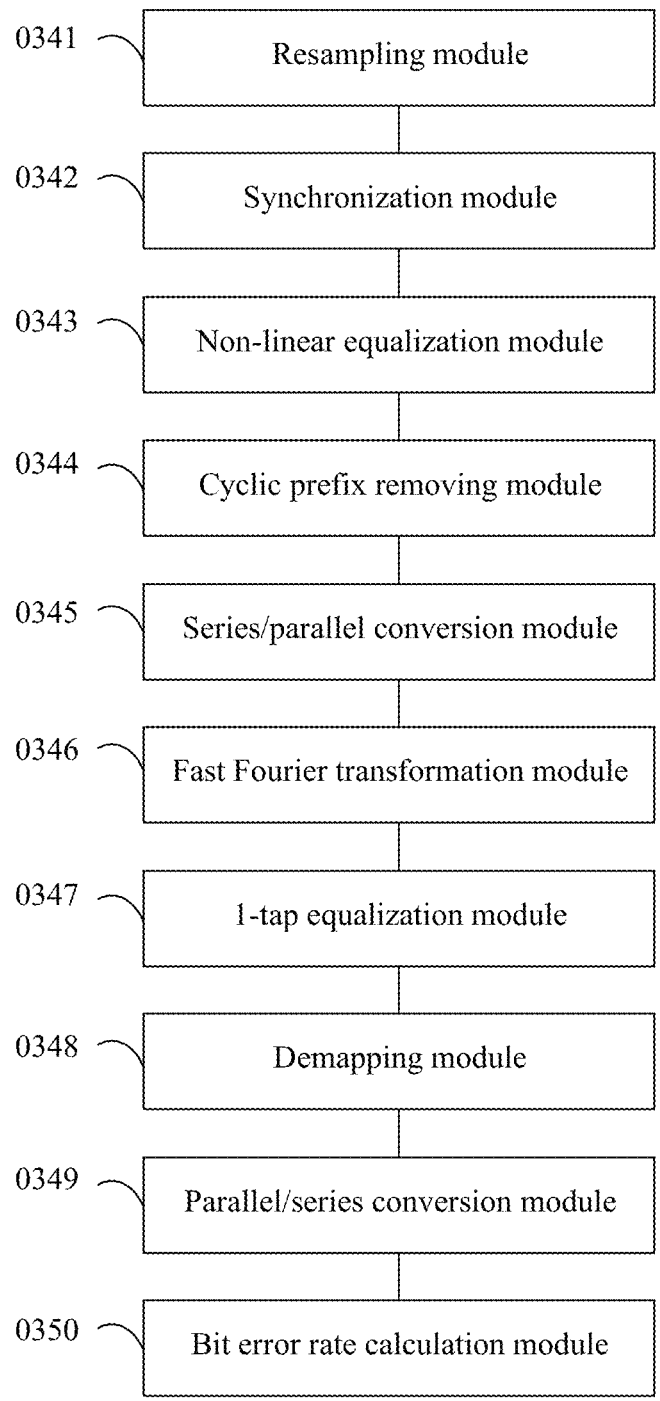
FIG. 3 is a schematic structural diagram of a receive DSP unit according to an embodiment of the present application.

FIG. 3 is a schematic structural diagram of a receive DSP unit 034 according to an embodiment of the present application. As shown in FIG. 3, the receive DSP unit 034 may include a resampling module 0341, a synchronization module 0342, a non-linear equalization (NLE) module 0343, a cyclic prefix removing (CP Removing) module 0344, a series/parallel (S/P) conversion module 0345, a fast Fourier transformation (FFT) module 0346, a 1-tap equalization module 0347, a demapping module 0348, a parallel/series (P/S) conversion module 0349, and a bit error rate (BER) calculation module 0350 that are sequentially connected in series.

The resampling module 0341 is configured to match a sampling rate of an analog-to-digital conversion unit and a sampling rate of the receive DSP unit. The synchronization module 0342 is configured to find a start point of a signal, to correctly process the signal. The NLE module 0343 is configured to compensate for system non-linear noise. The CP removing module 0344 is configured to remove a cyclic prefix from a signal. The S/P conversion module 0345 is configured to convert signals connected in series into signals connected in parallel. The FFT module 0346 is configured to transform a time-domain signal into a frequency-domain signal through FFT. The 1-tap equalization module 0347 is configured to compensate for system bandwidth impact. The demapping module 0348 is configured to convert symbol information into bit information. The P/S conversion module 0349 is configured to convert signals connected in parallel into signals connected in series through parallel/series conversion. The BER calculation module 0350 is configured to compare a bit signal received by a receiver with a bit signal sent by a transmitter, to calculate a bit error rate.

Figure 4:
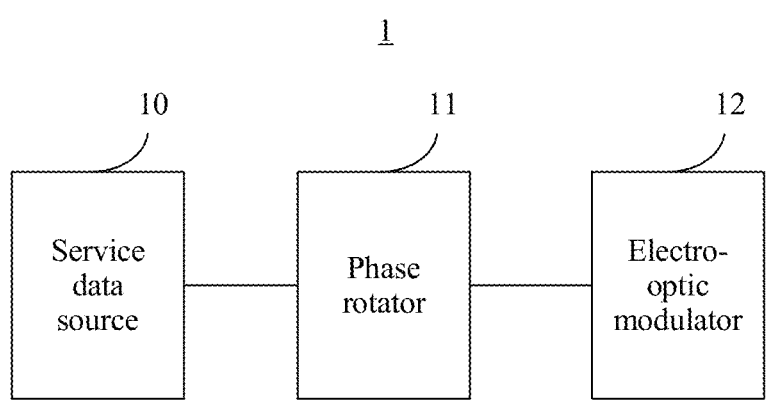
FIG. 4 is a schematic structural diagram of a signal transmitting apparatus according to an embodiment of the present application.

FIG. 4 is a schematic structural diagram of a signal transmitting apparatus 1 according to an embodiment of the present application. The transmitter 01 in the signal transmission system 0 shown in FIG. 1 may include the signal transmitting apparatus 1. As shown in FIG. 4, the signal transmitting apparatus 1 may include a service data source 10, a phase rotator 11, and an electro-optic modulator 12 that are connected in series.

The service data source 10 is configured to generate a real-number-type signal. The phase rotator 11 is configured to perform phase rotation processing on the real-number-type signal generated by the service data source 10, to obtain a complex-number-type signal. It should be noted that a value of a real part signal of the complex-number-type signal is equal to a value of an imaginary part signal of the complex-number-type signal. The electro-optic modulator 12 is configured to transmit the complex-number-type signal to a receiver through an optical fiber.

In conclusion, after generating the real-number-type signal, the signal transmitting apparatus provided in this embodiment of the present application further performs the phase rotation processing on the real-number-type signal to obtain the complex-number-type signal, so that a signal sent to the receiver through the optical fiber is the complex-number-type signal. In addition, a signal type of the complex-number-type signal does not change during transmission in the optical fiber, and both the real part signal and the imaginary part signal in the complex-number-type signal received by the receiver are related to a signal transmitted by the transmitter, so that no energy waste is caused during power detection performed by the receiver on both the received real part signal and the received imaginary part signal. Therefore, an energy waste rate of the receiver during the power detection is reduced.

For example, the real-number-type signal generated by the service data source 10 may be a pulse amplitude modulation-4 (PAM4) signal or another modulation signal, such as an on-off-keying (OOK) signal, a direct multi-tone technology (DMT) signal, or a carrierless amplitude phase modulation (CAP) signal.

Optionally, the phase rotator 11 may include a power divider circuit, a phase transform circuit, and an adder circuit. The power divider circuit may divide, into two channels of real-number-type signals, one channel of real-number-type signal generated by the service data source. For example, the two channels of real-number-type signals include a first real-number-type signal and a second real-number-type signal. The phase transform circuit may perform phase transform processing on the first real-number-type signal in the two channels of real-number-type signals, to obtain an imaginary-number-type signal. The adder circuit may add the second real-number-type signal and the imaginary-number-type signal to obtain a complex-number-type signal.

Figure 5:
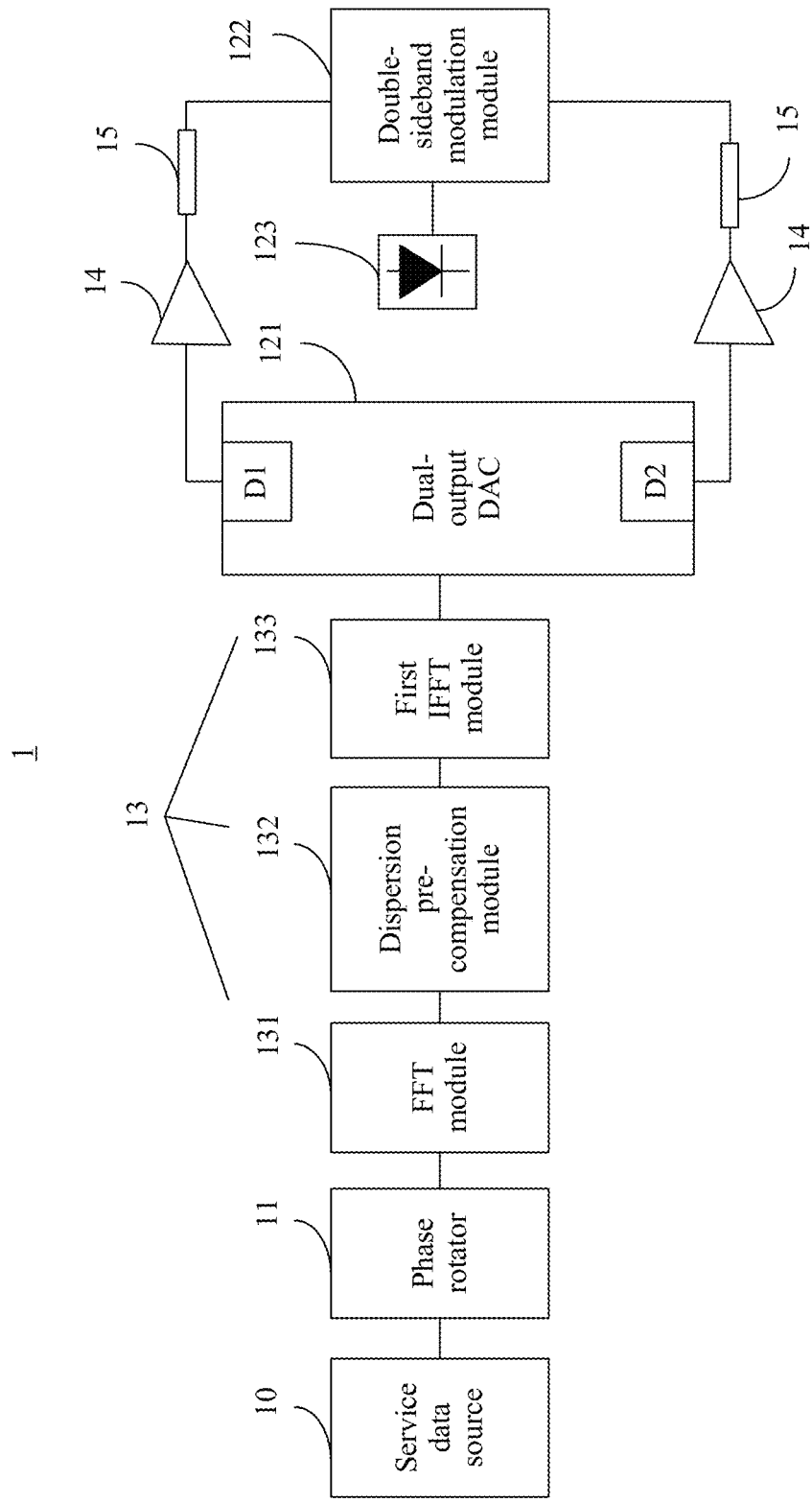
FIG. 5 is a schematic structural diagram of another signal transmitting apparatus according to an embodiment of the present application.

FIG. 5 is a schematic structural diagram of another signal transmitting apparatus 1 according to an embodiment of the present application. As shown in FIG. 5, based on FIG. 4, the signal transmitting apparatus 1 may further include a dispersion pre-compensator 13 that is serially connected between the phase rotator 11 and the electro-optic modulator 12. The dispersion pre-compensator 13 may include an FFT module 131, a dispersion pre-compensation module 132, and a first inverse fast Fourier transformation (IFFT) module 133 that are connected in series.

For example, the FFT module 131 may be configured to perform FFT processing on a complex-number-type signal. The dispersion pre-compensation module 132 is configured to perform dispersion pre-compensation processing on the complex-number-type signal on which the FFT processing has been performed. For example, the dispersion pre-compensation module 132 may be a frequency domain multiplication circuit. The frequency domain multiplication circuit is configured to multiply the complex-number-type signal on which the FFT processing has been performed and an inverse function of a frequency domain response curve of an optical fiber, to implement the dispersion pre-compensation processing on the complex-number-type signal on which the FFT processing has been performed. The first IFFT module 133 is configured to perform first IFFT processing on the complex-number-type signal on which the dispersion pre-compensation processing has been performed. The electro-optic modulator is configured to transmit, to a receiver through an optical fiber, the complex-number-type signal on which the first IFFT processing has been performed.

Further, the electro-optic modulator may include a dual-output digital-to-analog converter (DAC) 121 and a double-sideband modulation (DSB) module 122 that are connected in series.

The dual-output DAC 121 may be configured to process the complex-number-type signal to obtain a real part signal and an imaginary part signal of the complex-number-type signal. The dual-output DAC 121 is further configured to transmit the real part signal and the imaginary part signal to the double-sideband modulation module 122 through two output ends (an output end D1 and an output end D2) of the dual-output DAC 121. The double-sideband modulation module 122 is configured to perform modulation processing on the received real part signal and the received imaginary part signal to obtain a double-sideband complex-number-type signal. The double-sideband modulation module 122 is further configured to transmit the double-sideband complex-number-type signal to the receiver through the optical fiber.

The double-sideband modulation module 122 in this embodiment of the present application may have a plurality of forms. The following describes two of the forms in detail by using an example.

Figure 6:
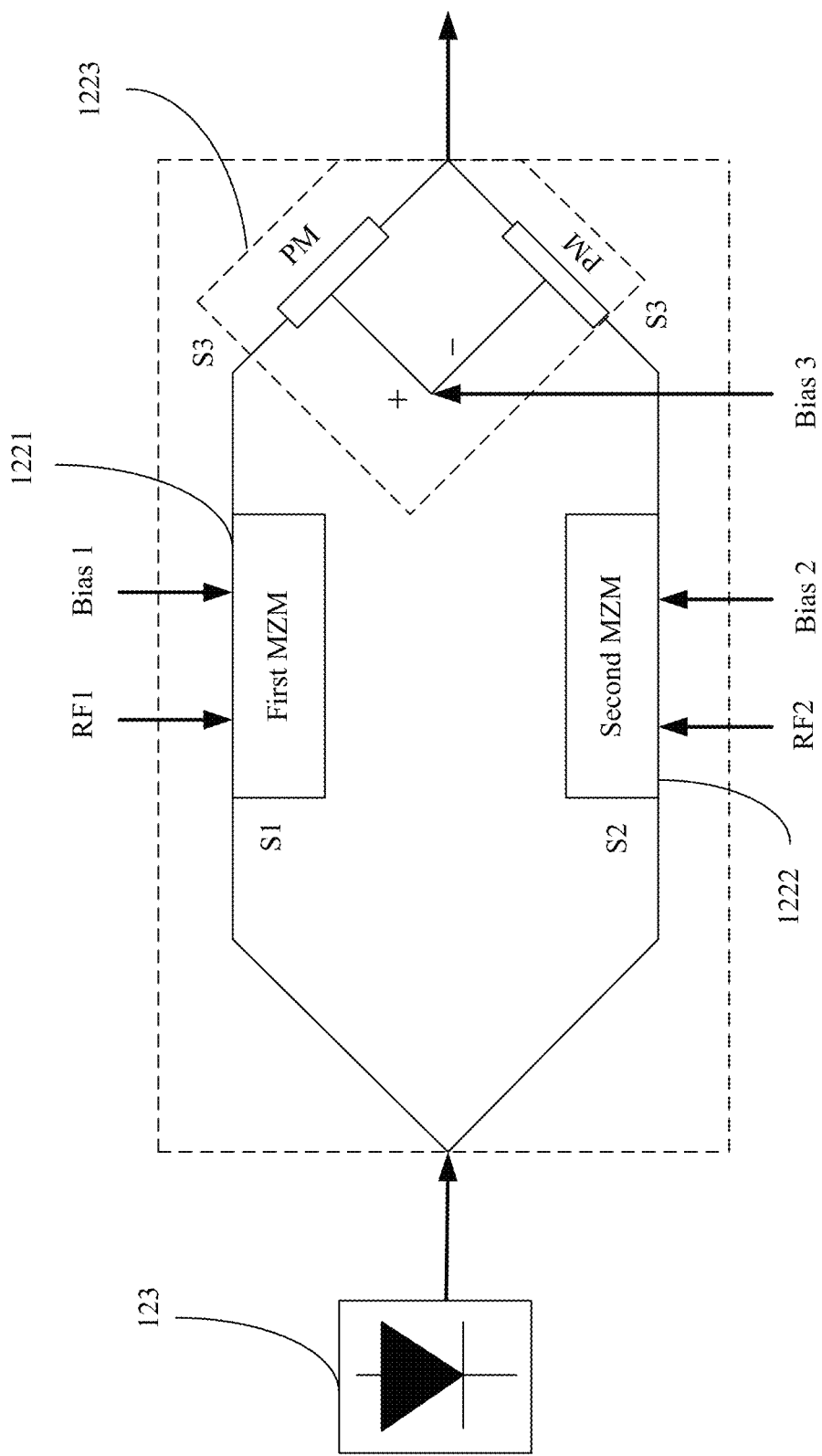
FIG. 6 is a schematic structural diagram of a double-sideband modulation module according to an embodiment of the present application.

In a case, FIG. 6 is a schematic structural diagram of a double-sideband modulation module according to an embodiment of the present application. As shown in FIG. 6, the double-sideband modulation module is an IQ Mach-Zehnder modulator (IQMZM). For example, the IQMZM may include a first Zehnder modulator (MZM) 1221, a second MZM 1222, and a third MZM 1223.

Two output ends of a dual-output DAC are serially connected to the first MZM 1221 and the second MZM 1222. For example, the two output ends of the dual-output DAC are connected to a radio frequency input end RF1 of the first MZM 1221 and a radio frequency input end RF2 of the second MZM 1222. The first MZM 1221 and the second MZM 1222 are connected in parallel. In addition, both the first MZM 1221 and the second MZM 1222 are serially connected to the third MZM 1223. The third MZM 1223 is connected to a receiver through an optical fiber. All of a bias amount of a bias end bias 1 of the first MZM 1221, a bias amount of a bias end bias 2 of the second MZM 1222, and a bias amount of a bias end bias 3 of the third MZM 1223 may be $$\frac{\pi}{4}.$$

For example, the third MZM may include two phase modulators (PM).

It should be noted that the electro-optic modulator shown in FIG. 5 may further include an optical source 123. The optical source is connected to an optical input end of the double-sideband modulation module 122. With reference to FIG. 5 and FIG. 6, the optical source 123 may be connected to an optical input end S1 of the first MZM 1221 and an optical input end S2 of the second MZM. An optical signal sent by the optical source 123 can be input into the first MZM 1221 by using the optical input end S1, and can be input into the second MZM 1222 by using the optical input end S2. The first MZM 1221 can load, onto the optical signal, a radio frequency signal input by the radio frequency input end RF1, and transmit the optical signal to an optical input end S3 of the third MZM 1223. The second MZM 1222 can load, onto the optical signal, a radio frequency signal input by the radio frequency input end RF2, and transmit the optical signal to the optical input end S3 of the third MZM 1223. The third MZM 1223 processes the two received radio frequency signals loaded onto the optical signal, to obtain a double-sideband complex-number-type signal, loads the double-sideband complex-number-type signal onto the optical signal, and transmits the optical signal to the receiver through the optical fiber.

Figure 7:
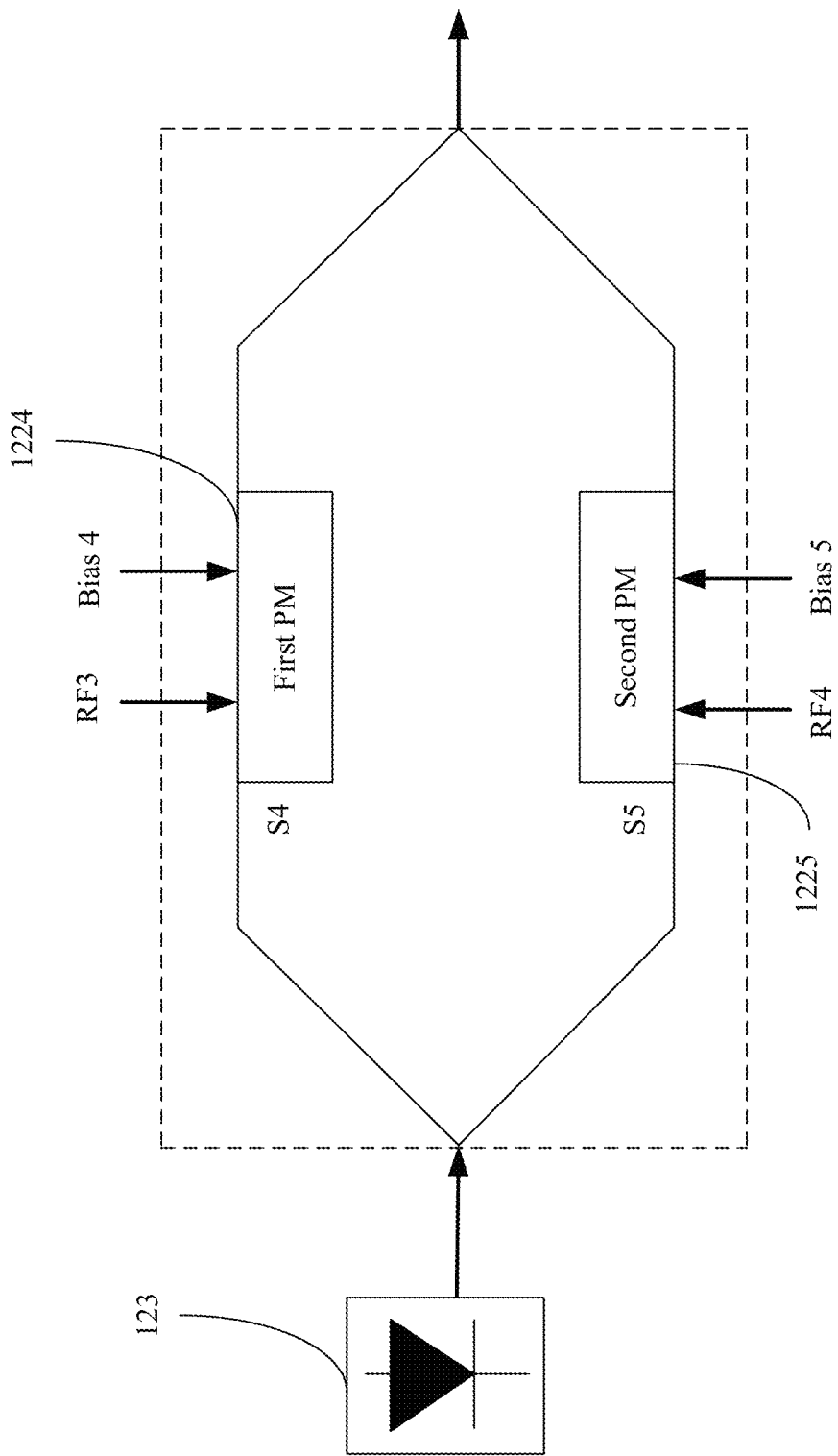
FIG. 7 is a schematic structural diagram of another double-sideband modulation module according to an embodiment of the present application.

In another case, FIG. 7 is a schematic structural diagram of another double-sideband modulation module according to an embodiment of the present application. As shown in FIG. 7, the double-sideband modulation module 122 may be a dual-driver Mach-Zehnder modulator (DDMZM). The DDMZM may include a first PM 1224 and a second PM 1225.

Two output ends of a dual-output DAC are serially connected to the first PM 1224 and the second PM 1225. For example, the two output ends of the dual-output DAC are connected to a radio frequency input end RF3 of the first PM 1224 and a radio frequency input end RF4 of the second PM 1225. The first PM 1224 and the second PM 1225 are connected in parallel, and both the first PM 1224 and the second PM 1225 are connected to a receiver through an optical fiber. Both a bias amount of a bias end bias 4 of the first PM 1224 and a bias amount of a bias end bias 5 of the second PM 1225 are $$\frac{\pi}{4}.$$

It should be noted that the electro-optic modulator 12 shown in FIG. 5 may further include an optical source 123. The optical source is connected to an optical input end of the double-sideband modulation module 122. With reference to FIG. 5 and FIG. 7, the optical source 123 may be connected to an optical input end S4 of the first PM 1224 and an optical input end S5 of the second PM 1225. An optical signal sent by the optical source 123 can be input into the first PM 1224 by using the optical input end S4, and can be input into the second PM 1225 by using the optical input end S5. The first PM 1224 can load, onto the optical signal, a radio frequency signal input by the radio frequency input end RF3, and transmit the optical signal to an optical fiber. The second PM 1225 can load, onto the optical signal, a radio frequency signal input by the radio frequency input end RF4, and transmit the optical signal to the optical fiber. The two radio frequency signals received by the optical fiber can be aggregated as a double-sideband complex-number-type signal, and the double-sideband complex-number-type signal may be transmitted the receiver through the optical fiber.

In this embodiment of the present application, at least one of a linear driving amplifier and an attenuator may be serially connected between each of the output ends of the dual-output DAC and a modulator (for example, an MZM or a PM) that is serially connected to the output end. Still referring to FIG. 5, in the two output ends D1 and D2 of the dual-output DAC, one linear driving amplifier 14 and one attenuator 15 are serially connected to a line connected between each of the output ends and the double-sideband modulation module 122.

Figure 8:
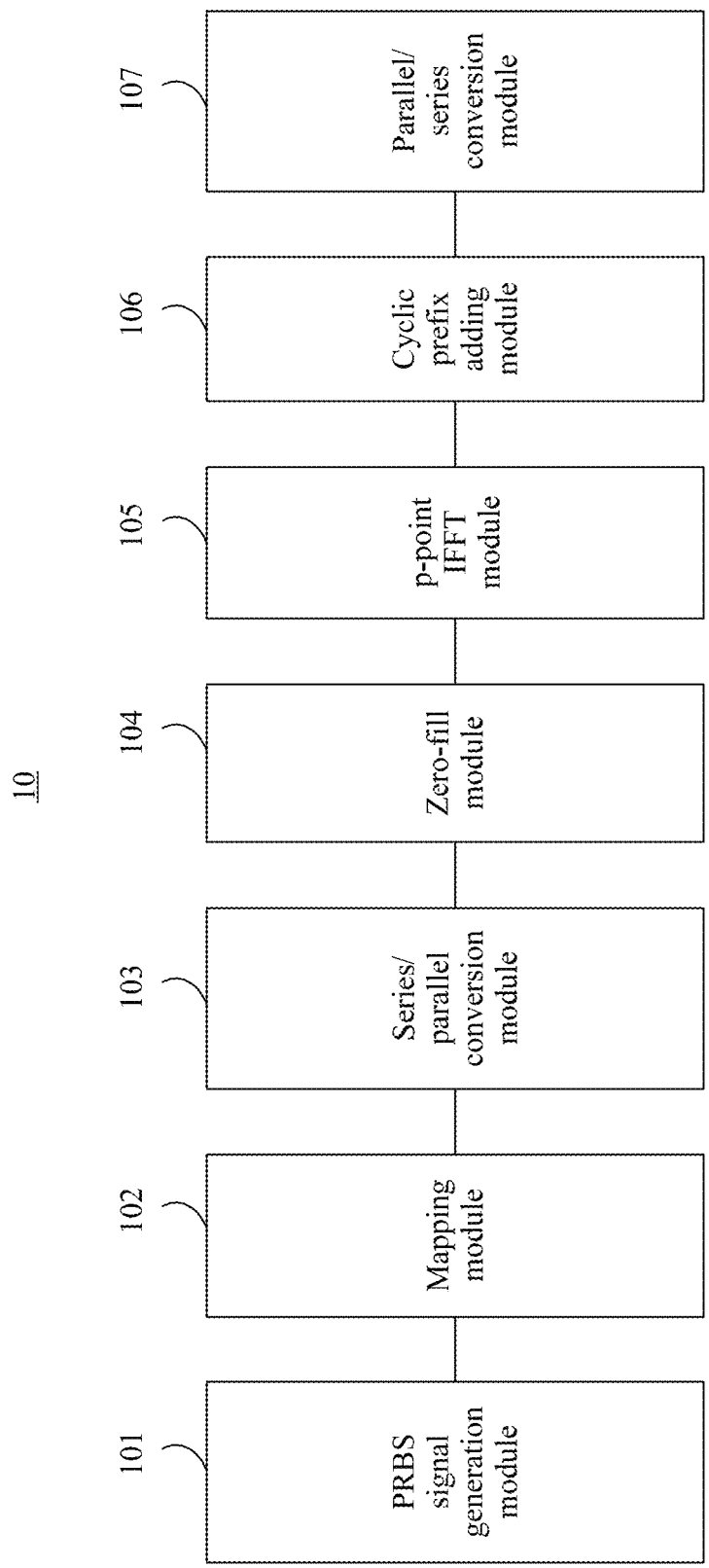
FIG. 8 is a schematic structural diagram of a service data source according to an embodiment of the present application.

FIG. 8 is a schematic structural diagram of a service data source 10 according to an embodiment of the present application. As shown in FIG. 8, the service data source 10 may include a pseudo-random binary sequence (PRBS) signal generation module 101, a mapping module 102, a series/parallel conversion module 103, a zero-fill module 104, a p-point IFFT module 105, a cyclic prefix adding module 106, and a parallel/series conversion module 107 that are connected in series, where p may be 2 raised to the power of q, and q is an integer greater than or equal to 1. Optionally, p may be 512.

The PRBS signal generation module 101 may be configured to generate 2m×n PRBS signals, where both m and n are integers greater than or equal to 1. The mapping module 102 may be configured to perform mapping processing on the 2m×n PRBS signals generated by the PRBS signal generation module, to obtain mapping signals. The series/parallel conversion module 103 may be configured to perform series/parallel conversion processing on the mapping signals, to obtain 2m frequency-domain signals. The 2m frequency-domain signals may include m positive-frequency signals and m negative-frequency signals, and each of the m positive-frequency signals is conjugate to one of the m negative-frequency signals. The zero-fill module 104 may be configured to perform zero-fill processing on the 2m frequency-domain signals obtained by the series/parallel conversion module 103, to obtain p frequency-domain signals. The p-point IFFT module 105 may be configured to perform p-point IFFT processing on the p frequency-domain signals obtained by the zero-fill module 104, to obtain p time-domain signals. The cyclic prefix adding module 106 is configured to add a cyclic prefix to the p time-domain signals, to obtain an anti-dispersion signal. The parallel/series conversion module 107 may be configured to perform parallel/series conversion processing on the anti-dispersion signal, to obtain a real-number-type signal.

In this embodiment of the present application, the service data source, the phase rotator, and the dispersion pre-compensator may constitute a transmit DSP unit. The signal transmitting apparatus may include the transmit DSP unit and the electro-optic modulator.

In conclusion, after generating the real-number-type signal, the signal transmitting apparatus provided in this embodiment of the present application further performs the phase rotation processing on the real-number-type signal to obtain the complex-number-type signal, so that a signal sent to the receiver through the optical fiber is the complex-number-type signal. In addition, a signal type of the complex-number-type signal does not change during transmission in the optical fiber, and both the real part signal and the imaginary part signal in the complex-number-type signal received by the receiver are related to a signal transmitted by a transmitter, so that no energy waste is caused during power detection performed by the receiver on both the received real part signal and the received imaginary part signal. Therefore, an energy waste rate of the receiver during the power detection is reduced.

Figure 9:
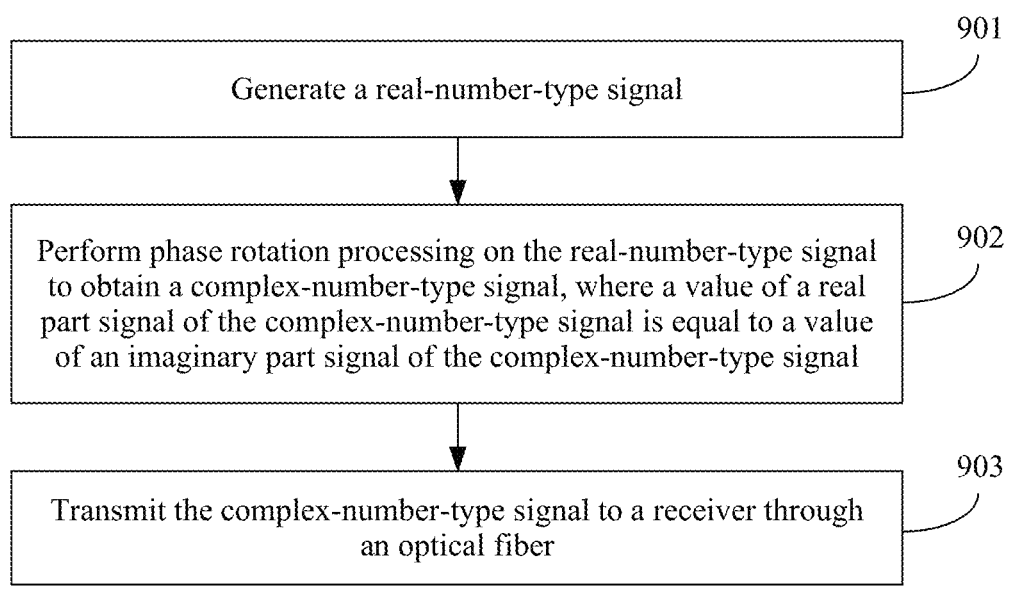
FIG. 9 is a flowchart of a signal transmitting method according to an embodiment of the present application.

FIG. 9 is a flowchart of a signal transmitting method according to an embodiment of the present application. The signal transmitting method may be used in the signal transmitting apparatus 1 shown in FIG. 4. The signal transmitting method may include the following steps.

Step 901: Generate a real-number-type signal.

Step 902: Perform phase rotation processing on the real-number-type signal to obtain a complex-number-type signal, where a value of a real part signal of the complex-number-type signal is equal to a value of an imaginary part signal of the complex-number-type signal.

Step 903: Transmit the complex-number-type signal to a receiver through an optical fiber.

In conclusion, in the signal transmitting method provided in this embodiment of the present application, after generating the real-number-type signal, the signal transmitting apparatus further performs the phase rotation processing on the real-number-type signal to obtain the complex-number-type signal, so that a signal sent to the receiver through the optical fiber is the complex-number-type signal. In addition, a signal type of the complex-number-type signal does not change during transmission in the optical fiber, and both the real part signal and the imaginary part signal in the complex-number-type signal received by the receiver are related to a signal transmitted by the signal transmitting apparatus, so that no energy waste is caused during power detection performed by the receiver on both the received real part signal and the received imaginary part signal. Therefore, an energy waste rate of the receiver during the power detection is reduced.

Figure 10:
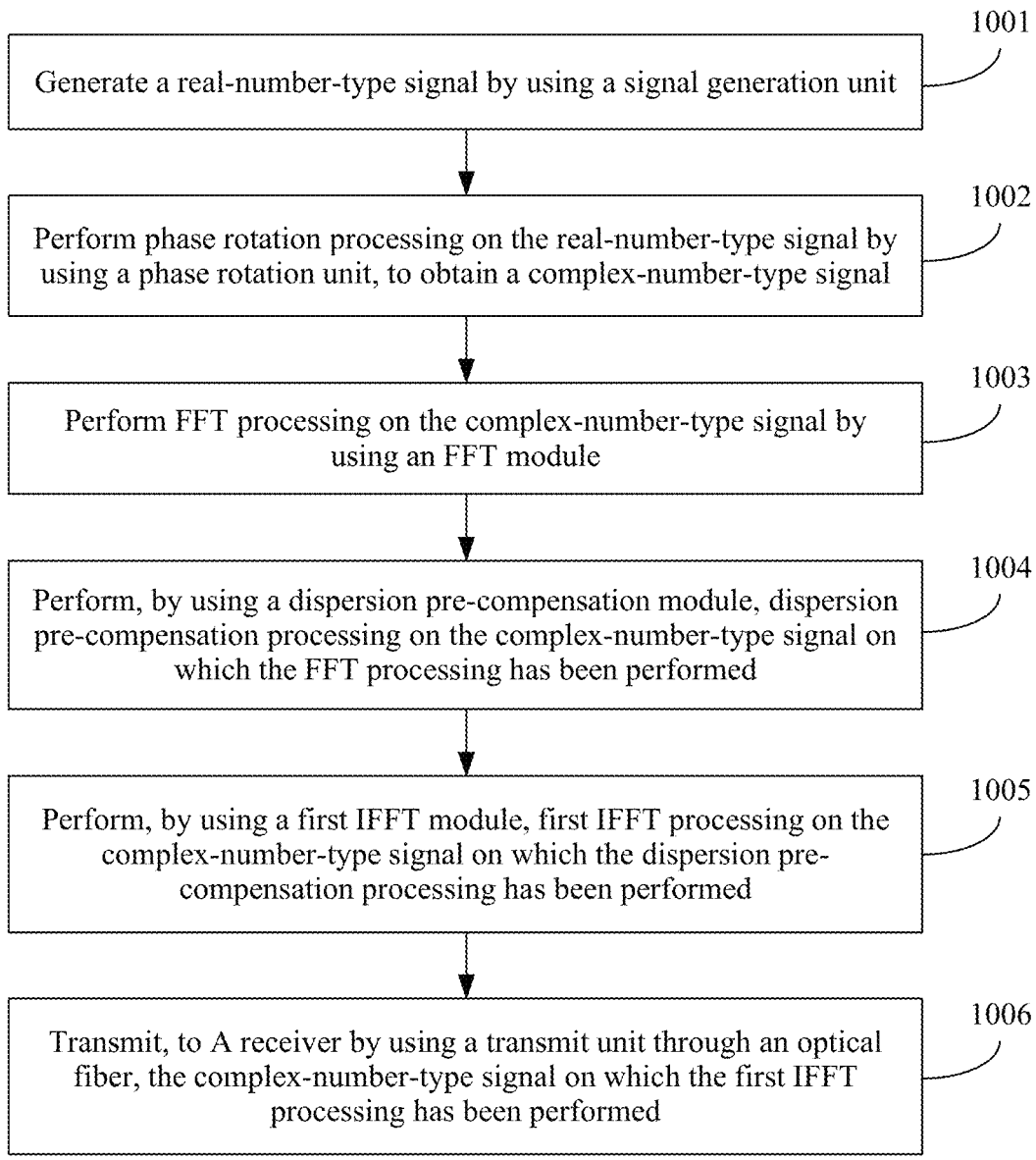
FIG. 10 is a flowchart of a signal transmitting method according to an embodiment of the present application.

FIG. 10 is a flowchart of a signal transmitting method according to an embodiment of the present application. The signal transmitting method may be used in the signal transmitting apparatus 1 shown in FIG. 5. The signal transmitting apparatus may include a service data source, a phase rotator, and an electro-optic modulator that are connected in series. The signal transmitting method may include the following steps.

Step 1001: Generate a real-number-type signal by using the service data source.

Referring to FIG. 8, in step 1001, first, 2m×n PRBS signals may be generated by using a PRBS signal generation module, where both m and n may be integers greater than or equal to 1. Then, mapping processing may be performed on the 2m×n PRBS signals by using a mapping module, to obtain mapping signals; and series/parallel conversion processing may be performed on the mapping signals by using a series/parallel conversion module, to obtain 2m frequency-domain signals. In other words, the 2m×n PRBS signals that are connected in series are converted into the 2m frequency-domain signals that are connected in parallel. The 2m frequency-domain signals may include m positive-frequency signals and m negative-frequency signals, and each of the m positive-frequency signals is conjugate to one of the m negative-frequency signals.

Further, zero-fill processing may be performed on the 2m frequency-domain signals by using a zero-fill module, to obtain p frequency-domain signals. For example, p is 512 in this embodiment of the present application. In an actual application, p may be another value, for example, p is 2 raised to the power of q, and q is an integer greater than or equal to 1. Then, p-point IFFT processing is performed, by using a p-point IFFT module, on the p frequency-domain signals obtained through the zero-fill processing, to obtain p time-domain signals. A cyclic prefix is added to the p time-domain signals by using a cyclic prefix adding module, to obtain an anti-dispersion signal; and parallel/series conversion processing is performed on the anti-dispersion signal by using a parallel/series conversion module, to obtain the real-number-type signal.

Step 1002: Perform phase rotation processing on the real-number-type signal by using the phase rotator, to obtain a complex-number-type signal.

Optionally, a value of a real part signal of the complex-number-type signal is equal to a value of an imaginary part signal of the complex-number-type signal. It is assumed that the real-number-type signal generated in step 1001 is A. In this case, the complex-number-type signal obtained after the phase rotator processes the real-number-type signal A in step 1002 may be A+jA. The real part signal of the complex-number-type signal A+jA is A, and the imaginary part signal of the complex-number-type signal A+jA is A, where j is an imaginary unit. In other words, the real part signal (A) of the complex-number-type signal A+jA is equal to the imaginary part signal (A) of the complex-number-type signal A+jA.

Step 1003: Perform FFT processing on the complex-number-type signal by using an FFT module.

Optionally, as shown in FIG. 5, the signal transmitting apparatus 1 may further include a dispersion pre-compensator 13 that is serially connected between the phase rotator 11 and the electro-optic modulator 12. The dispersion pre-compensator 13 may include an FFT module 131, a dispersion pre-compensation module 132, and a first IFFT module 133 that are connected in series. In step 1003, the FFT module may process the complex-number-type signal A+jA obtained in step 1002, to obtain fft(A+jA).

Step 1004: Perform, by using a dispersion pre-compensation module, dispersion pre-compensation processing on the complex-number-type signal on which the FFT processing has been performed.

After the FFT processing is performed on the complex-number-type signal, the complex-number-type signal on which the FFT processing has been performed, namely, fft(A+jA), may be processed by using the dispersion pre-compensation module, to obtain $fft(A+jA)*CD^{-1}$.

With development of communications technologies, a working frequency of long-range optical communication develops from 2.5 Gigahertz (GHz), 10 GHz, or 40 GHz to current 100 GHz or 200 GHz. In recent years, with rapid development of mobile Internet applications (such as high definition videos, three-dimensional live broadcast, virtual reality), people also impose a higher requirement on a rate of short-range communication. In a short-range application, a direct detection technology is usually used to receive a signal. However, signal dispersion still exists during short-range signal transmission. Currently, main methods for resolving signal dispersion include a dispersion compensation optical fiber, an adjustable dispersion compensation module, an optical-domain single-sideband filter, and electro-domain DSP dispersion pre-compensation. With development of a DSP technology, the method of electro-domain DSP dispersion pre-compensation is increasingly popular.

In this embodiment of the present application, the service data source, the phase rotator, and the dispersion pre-compensator may constitute a transmit DSP unit. The dispersion pre-compensator in the transmit DSP unit can perform dispersion pre-compensation on a signal that needs to be sent by a transmitter, to compensate the signal for dispersion occurring in an optical fiber, to ensure that a signal received by a receiver is relatively consistent with the signal sent by the transmitter.

Step 1005: Perform, by using a first IFFT module, first IFFT processing on the complex-number-type signal on which the dispersion pre-compensation processing has been performed.

In step 1005, the first IFFT module may process the complex-number-type signal on which the dispersion pre-compensation processing has been performed, namely, fft $(A+jA)*CD^{-1}$, to obtain ifft $[fft(A+jA)*CD^{-1}]$.

Step 1006: Transmit, to a receiver by using the electro-optic modulator through an optical fiber, the complex-number-type signal on which the first IFFT processing has been performed.

As shown in FIG. 5, the electro-optic modulator may include a dual-output DAC and a double-sideband modulation module that are connected in series. In step 1006, the complex-number-type signal may be processed by using the dual-output DAC, to obtain the real part signal and the imaginary part signal of the complex-number-type signal. Then the real part signal and the imaginary part signal are transmitted to the double-sideband modulation module by using the dual-output DAC through two output ends of the dual-output DAC. Modulation processing is performed on the real part signal and the imaginary part signal by using the double-sideband modulation module, to obtain a double-sideband complex-number-type signal, and the double-sideband complex-number-type signal is transmitted to the receiver by using the double-sideband modulation module through the optical fiber.

In a case, as shown in FIG. 6, the double-sideband modulation module may be an IQMZM. The IQMZM includes a first MZM, a second MZM, and a third MZM. The two output ends of the dual-output DAC are serially connected to the first MZM and the second MZM. The first MZM and the second MZM are connected in parallel, and both are serially connected to the third MZM. The third MZM is connected to the receiver through an optical fiber. Optionally, all of a bias amount of a bias end of the first MZM, a bias amount of a bias end of the second MZM, and a bias amount of a bias end of the third MZM may be $$\frac{\pi}{4}.$$

In another case, as shown in FIG. 7, the double-sideband modulation module may alternatively be a DDMZM. The DDMZM includes a first phase modulator PM and a second PM. The two output ends of the dual-output DAC are serially connected to the first PM and the second PM. The first PM and the second PM are connected in parallel, and both the first PM and the second PM are connected to the receiver through an optical fiber. Optionally, both a bias amount of a bias end of the first PM and a bias amount of a bias end of the second PM are $$\frac{\pi}{4}.$$

For example, the double-sideband complex-number-type signal $E_{out}$ obtained after the signal ifft[fft(A+jA)*CD$^{-1}$] generated in step 1005 is processed by using the dual-output DAC and the double-sideband modulation module may be $1+j+\{ifft[fft(A+jA)*CD^{-1}]\}=1+j+(I+j*Q)=E_{out}$.

A signal $E_{Rosa}$ that is transmitted to the receiver through the optical fiber may be as follows:

$$1+j+\{ifft[fft(A+jA)*CD^{-1}*CD]\}=1+j+A+j*A=E_{Rosa}.$$

Further, after receiving the signal, the receiver may perform power detection on the received signal. Both the real part signal and the imaginary part signal of the complex-number-type signal received by the receiver are related to the real-number-type signal A generated by the service data source in step 1001. Therefore, no energy waste is caused when the receiver performs the power detection on the received signal.

For example, optical power P detected by the receiver may be as follows:

$$P=E_{Rosa}*E*_{Rosa}=2*Re[(1+j)*(A+j*A)*]=4A.$$

Figure 11:
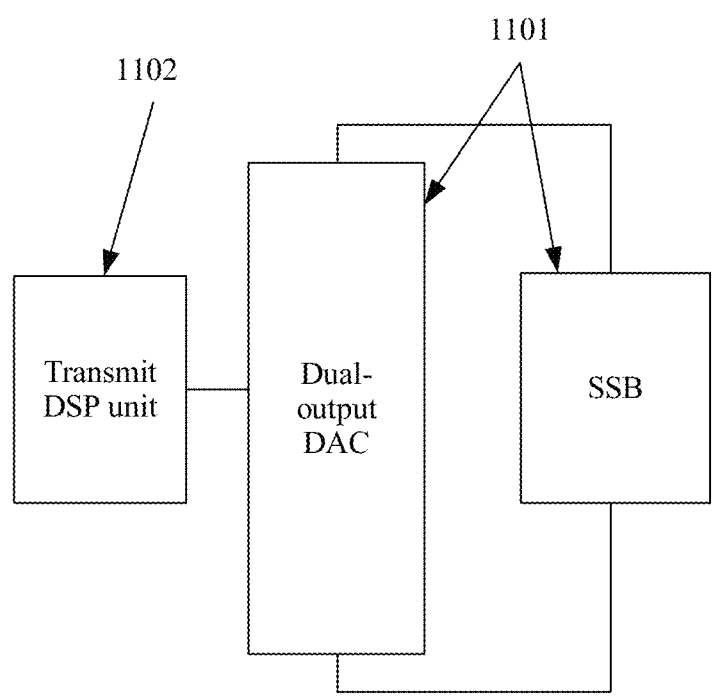
FIG. 11 is a schematic structural diagram of a transmitter according to a related technology.

FIG. 11 is a schematic structural diagram of a transmitter 110 according to a related technology. In the related technology shown in FIG. 11, the transmitter 110 includes an electro-optic modulator 1101 and a transmit DSP unit 1102 (the transmit DSP unit 1102 is different from the transmit DSP unit in this application). The electro-optic modulator 1101 includes a dual-output DAC and a single-sideband modulation (SSB) unit. A signal sent by the transmitter is an SSB signal. In this embodiment of the present application, the electro-optic modulator in the transmitter includes the dual-output DAC and the double-sideband modulation module. A signal sent by the transmitter is a DSB signal.

Figure 12:
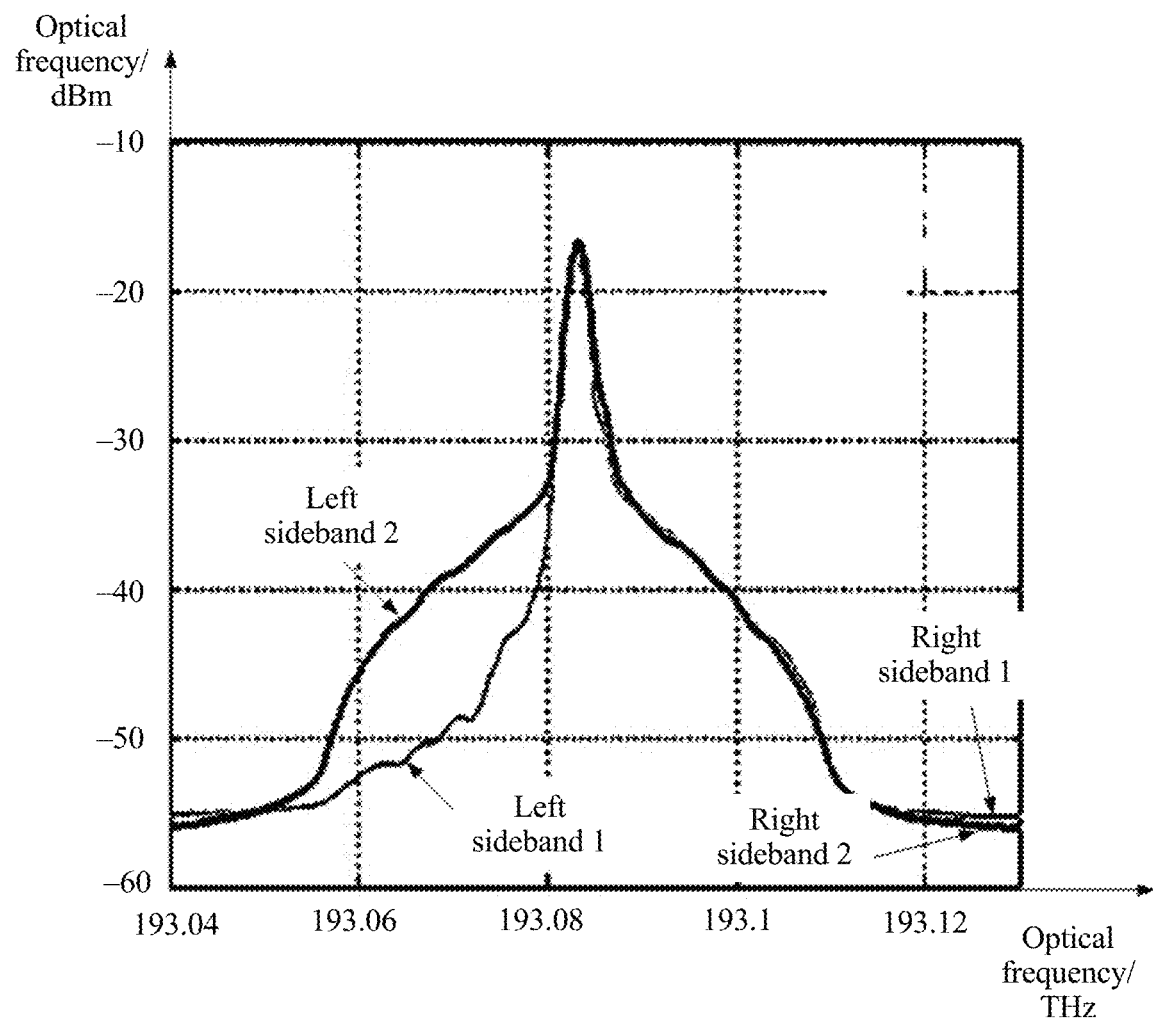
FIG. 12 is a schematic diagram of optical spectra according to an embodiment of the present application.

FIG. 12 is a schematic diagram of optical spectra according to this embodiment of the present application. As shown in FIG. 12, a horizontal axis in the schematic diagram of the optical spectra represents an optical frequency measured in terahertz (THz), and a vertical axis represents optical power measured in decibel relative to one milliwatt (dBm). It can be seen from the figure that optical spectra of an SSB signal may be divided into two sidebands (a left sideband 1 and a right sideband 1), and optical spectra of a DSB signal may also be divided into two sidebands (a left sideband 2 and a right sideband 2). Both the left sideband and the right sideband of the DSB signal include valid information. The right sideband of the SSB signal includes valid information while the left sideband (the left sideband 1) of the SSB signal includes only noise information but includes no valid information.

Figure 13:
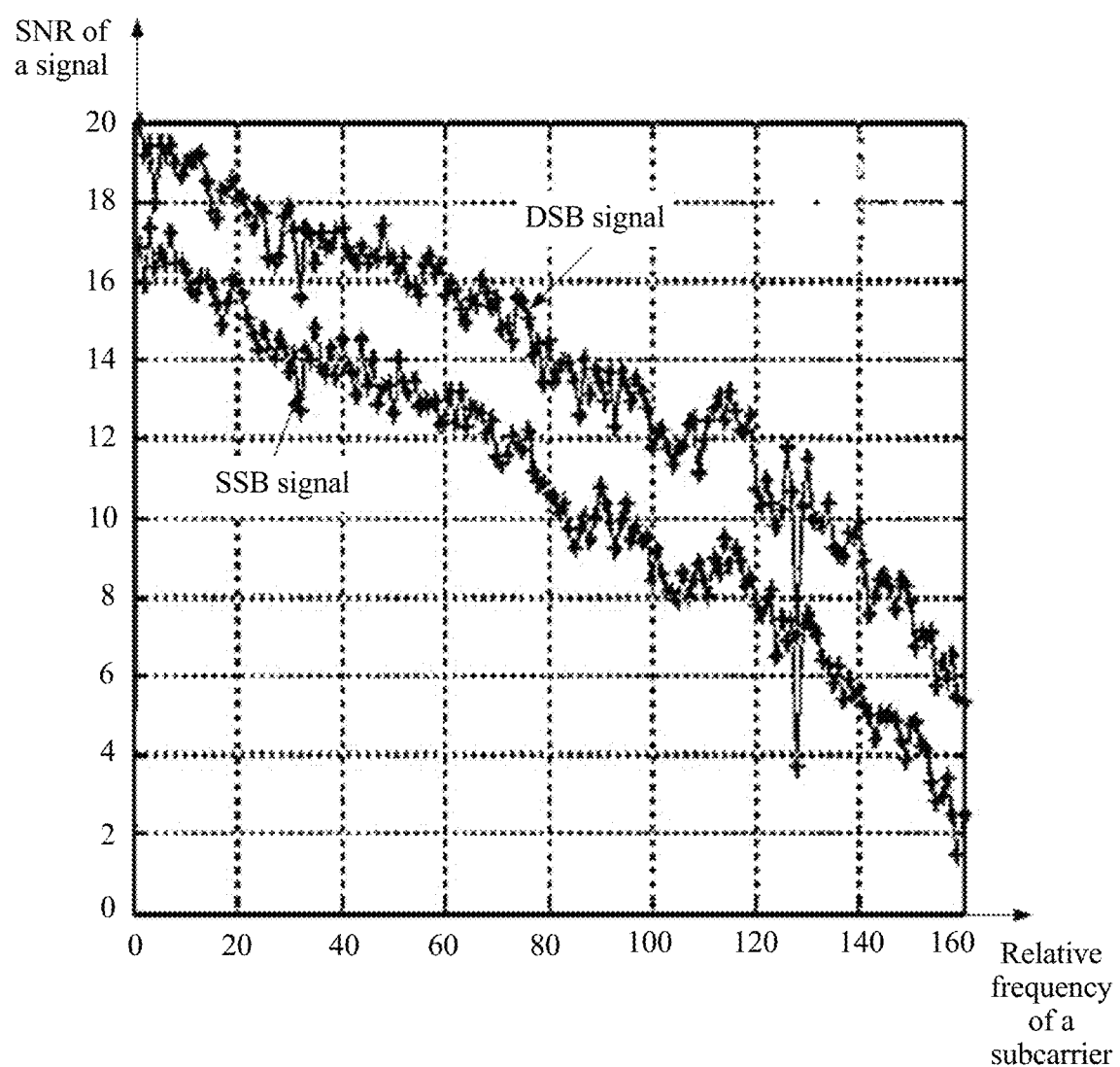
FIG. 13 is a schematic diagram of an SNR waveform according to an embodiment of the present application.

Because only one sideband of the SSB signal includes information, in comparison between the DSB signal and the SSB signal, the DSB signal includes a larger amount of information, and the DSB signal has a higher signal-to-noise ratio (SNR). In other words, a signal-to-noise ratio of the DSB signal sent by the transmitter in this embodiment of the present application is greater than a signal-to-noise ratio of the SSB signal sent by the transmitter in the related technology. FIG. 13 is a schematic diagram of an SNR waveform according to this embodiment of the present application. A horizontal axis in the schematic diagram of the waveform may represent a relative frequency (dimensionless) of a subcarrier (English: subcarrier), and a vertical axis represents an SNR (dimensionless) of a signal. As shown in FIG. 13, when relative frequencies of subcarriers are the same, an SNR of the DSB signal is greater than an SNR of the SSB signal.

In the related technology, the transmitter first generates a real-number-type signal A, and a signal $E_{out}$ that is obtained through dispersion pre-compensation processing and electro-optic modulation and that is output to an optical fiber may be as follows:

$$1+j+\{ifft[fft(A)*CD^{-1}]\}=1+j+(I+j*Q)=1+I+j(1+Q)=E_{out};$$

a signal that is transmitted to a receiver through the optical fiber may be represented as:

$$E_{Rosa}1+j+\{ifft[fft(A)*CD^{-1}*CD]\}=1+j+A; \text{ and}$$

optical power P detected by the receiver may be as follows:

$$P=E_{Rosa}*E*_{Rosa}=2*Re[(1+j)*A)]=2A.$$

To be specific, in the complex-number-type signal 1+j+A received by the receiver, a real part signal (1+A) is related to the signal A generated by the transmitter, while an imaginary part signal (1) is unrelated to the signal A generated by the transmitter. In this case, energy waste is caused during power detection performed by the receiver on the imaginary part signal of the complex-number-type signal. Therefore, an energy waste rate of the receiver during the power detection is relatively high. In addition, because only the real part signal in the signal received by the receiver is related to the signal sent by the transmitter, the power (2A) of the signal received by the receiver is relatively small.

In this embodiment of the present application, because both the real part signal (1+A) and the imaginary part signal (1+A) in the signal received by the receiver are related to the signal A generated by the transmitter, the signal received by the receiver has relatively high power. In addition, optical power 4A of the signal received by the receiver in this embodiment of the present application is twice the optical power 2A of the signal received by the receiver in the related technology.

Figure 14:
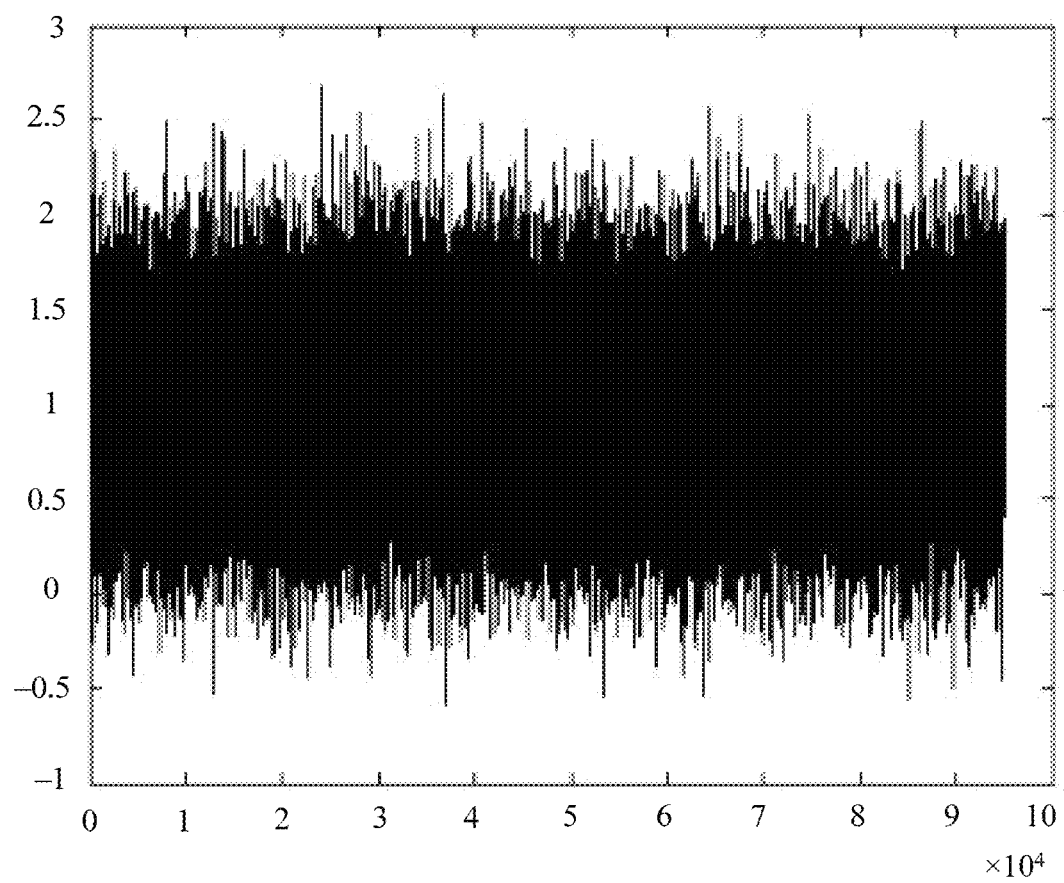
FIG. 14 is a schematic detection diagram of a real part signal of a signal received by a receiver according to an embodiment of the present application.
Figure 15:
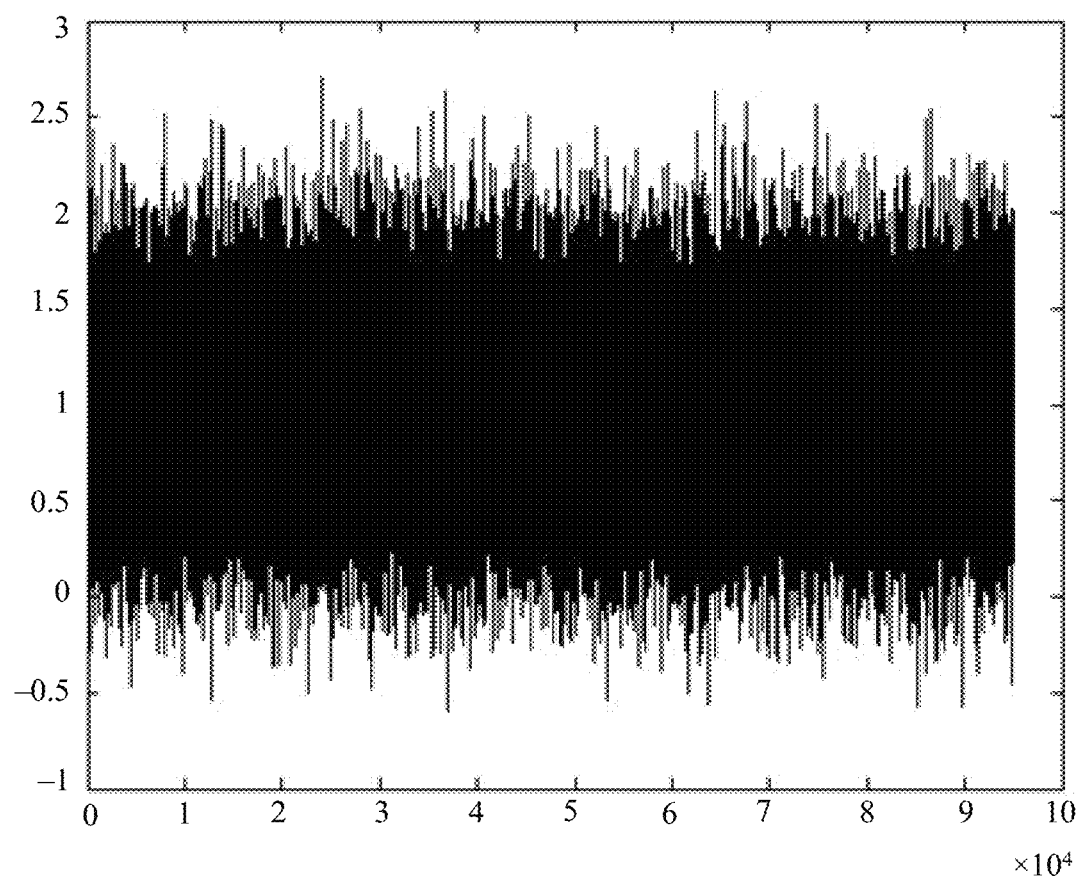
FIG. 15 is a schematic detection diagram of an imaginary part signal of a signal received by a receiver according to an embodiment of the present application.
Figure 16:
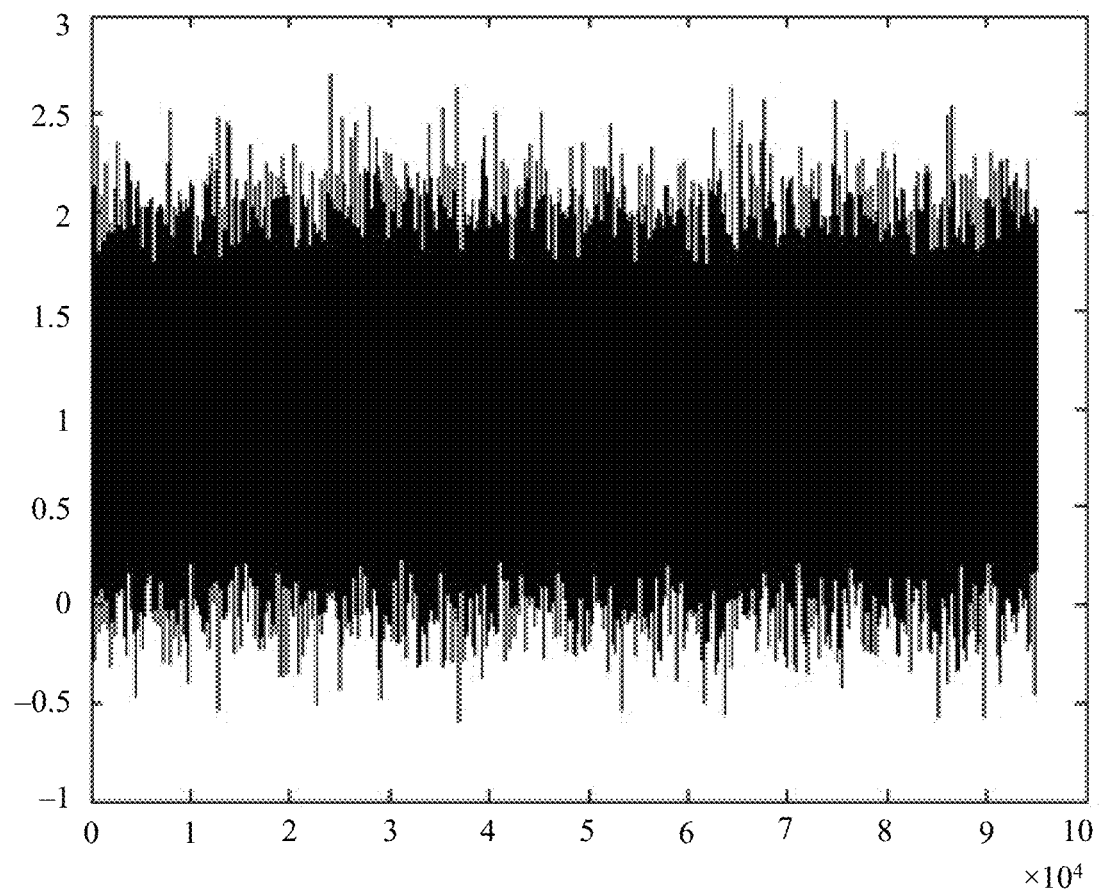
FIG. 16 is a schematic detection diagram of a real part signal of a signal received by a receiver according to a related technology.
Figure 17:
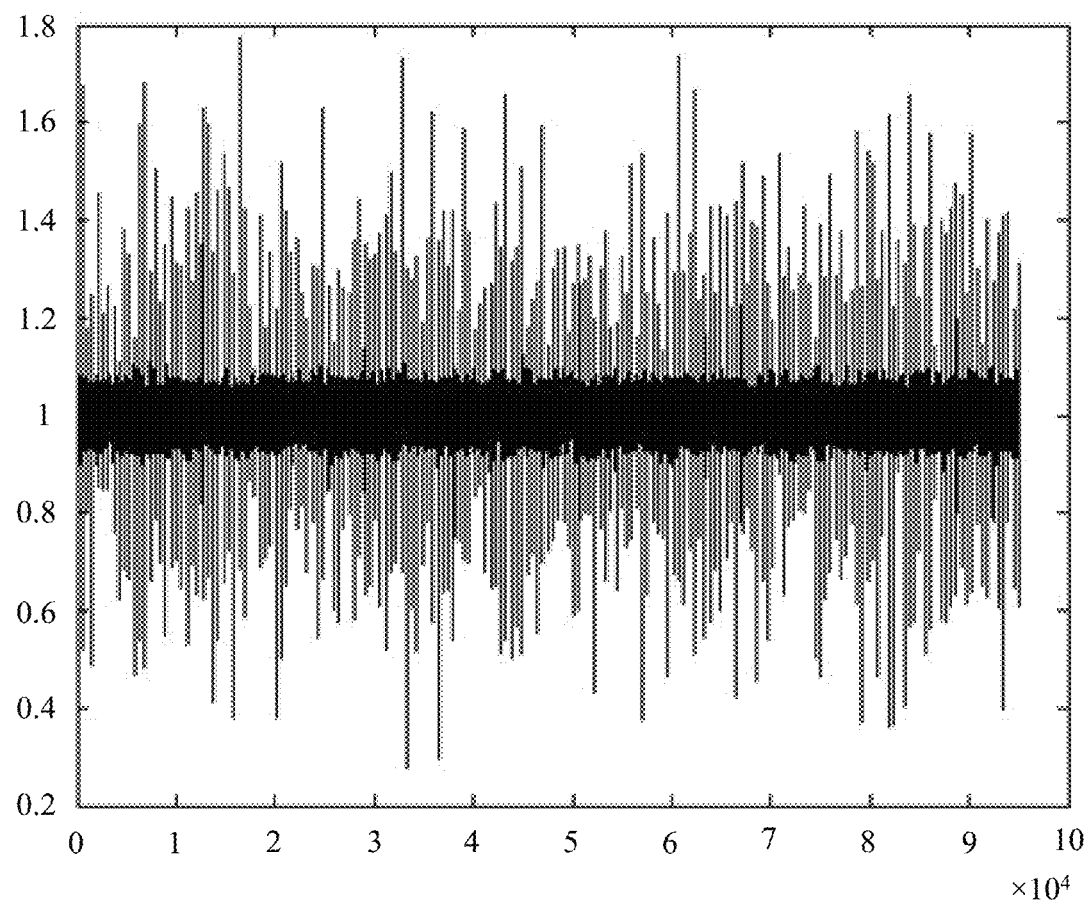
FIG. 17 is a schematic detection diagram of an imaginary part signal of a signal received by a receiver according to a related technology.

FIG. 14 is a schematic detection diagram of a real part signal of a signal received by a receiver according to an embodiment of the present application. FIG. 15 is a schematic detection diagram of an imaginary part signal of the signal received by the receiver according to this embodiment of the present application. FIG. 16 is a schematic detection diagram of a real part signal of a signal received by a receiver according to a related technology. FIG. 17 is a schematic detection diagram of an imaginary part signal of the signal received by the receiver according to the related technology. It should be noted that a horizontal axis in each of FIG. 14, FIG. 15, FIG. 16, and FIG. 17 represents a relative time domain (dimensionless) in a unit of $10^4$, and a vertical axis represents a signal amplitude measured in volt.

As shown in FIG. 14 and FIG. 15, in this embodiment of the present application, both the real part signal and the imaginary part signal of the complex-number-type signal received by the receiver include relatively much valid information, and both the real part signal and the imaginary part signal are related to a real-number-type signal generated by a transmitter. As shown in FIG. 16 and FIG. 17, in the related technology, in the complex-number-type signal received by the receiver, only the real part signal includes relatively much valid information while the imaginary part signal includes only relatively much noise information. The real part signal of the complex-number-type signal received by the receiver is related to a real-number-type signal generated by a transmitter, while the imaginary part signal is unrelated to the real-number-type signal generated by the transmitter.

Figure 18:
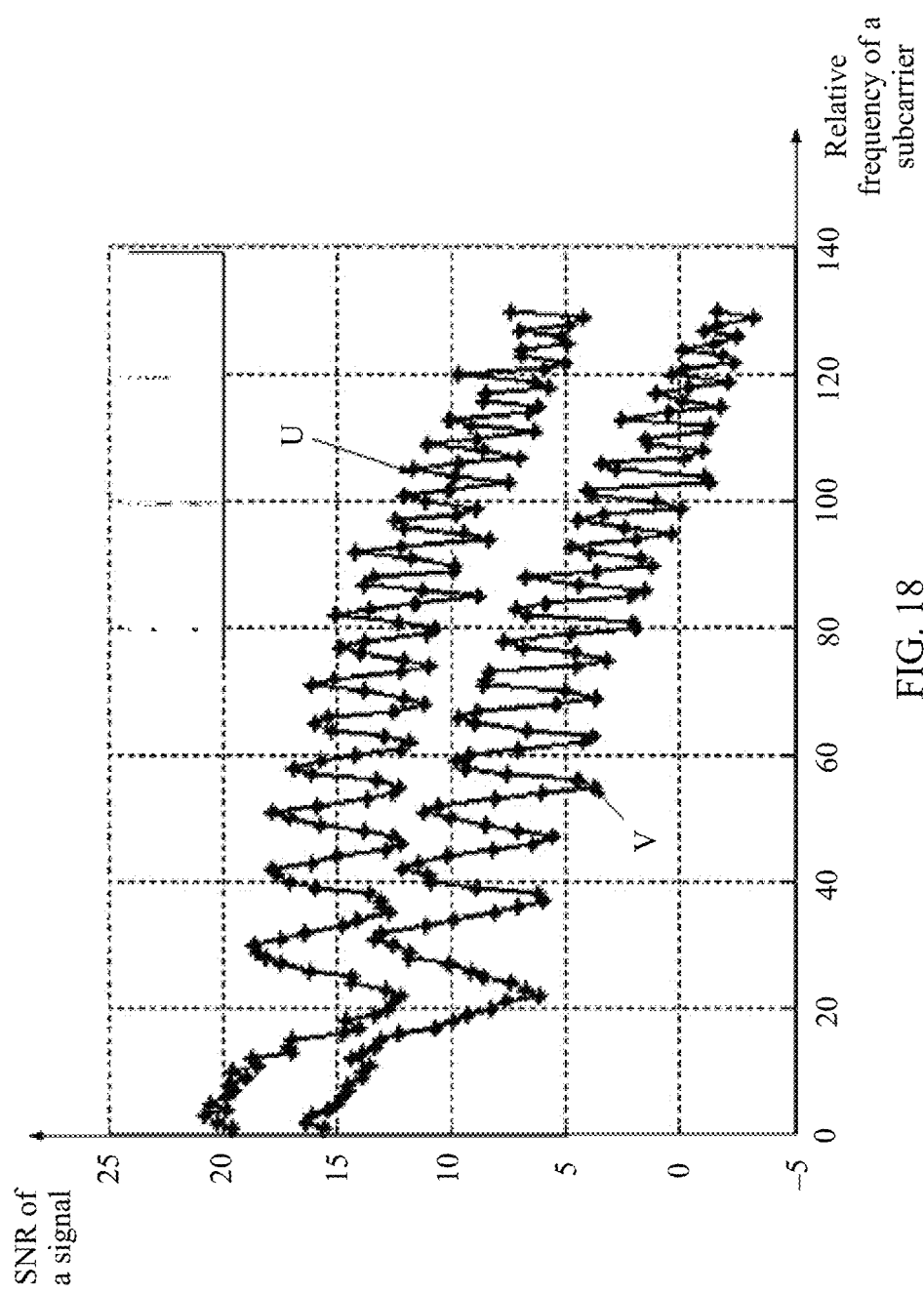
FIG. 18 is a schematic diagram of another SNR waveform according to an embodiment of the present application.

Further, in this embodiment of the present application, there is a relatively large amount of information in the complex-number-type signal received by the receiver. Therefore, in this embodiment of the present application, a signal-to-noise ratio of the complex-number-type signal received by the receiver is relatively large. FIG. 18 is a schematic diagram of another SNR waveform according to this embodiment of the present application. A horizontal axis in the schematic diagram of the waveform may represent a relative frequency of a subcarrier, and a vertical axis represents an SNR of a signal. As shown in FIG. 18, when relative frequencies of subcarriers are the same, a signal-to-noise ratio of a signal U received by the receiver in this embodiment of the present application is greater than a signal-to-noise ratio of a signal V received by the receiver in the related technology.

In conclusion, in the signal transmitting method provided in this embodiment of the present application, after generating the real-number-type signal, the signal transmitting apparatus further performs the phase rotation processing on the real-number-type signal to obtain the complex-number-type signal, so that a signal sent to the receiver through the optical fiber is the complex-number-type signal. In addition, a signal type of the complex-number-type signal does not change during transmission in the optical fiber, and both the real part signal and the imaginary part signal in the complex-number-type signal received by the receiver are related to a signal transmitted by the signal transmitting apparatus, so that no energy waste is caused during power detection performed by the receiver on both the received real part signal and the received imaginary part signal. Therefore, an energy waste rate of the receiver during the power detection is reduced.

Mutual reference may be made to the embodiment of the signal transmitting method, the embodiment of the signal transmitting apparatus, and the embodiment of the signal transmission system provided in the embodiments of the present application. Details are not described herein again in this embodiment of the present application.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A signal transmitting method, wherein the method is applied to a signal transmitter that comprises a phase rotator, the signal transmitter further comprises a service data source and an electro-optic modulator in series, the electro-optic modulator comprises a dual-output digital-to-analog converter (DAC) and a double-sideband modulation module that are connected in series, and the method comprises:
    generating a real-number-type signal, wherein the generating a real-number-type signal comprises generating the real-number-type signal by using the service data source;
    performing phase rotation processing on the real-number-type signal by using the phase rotator, to obtain a complex-number-type signal, wherein a value of a real part signal of the complex-number-type signal is equal to a value of an imaginary part signal of the complex-number-type signal; and
    transmitting the complex-number-type signal to a receiver by using the electro-optic modulator through an optical fiber, wherein the transmitting the complex-number-type signal comprises:
        processing the complex-number-type signal by using the dual-output DAC, to obtain the real part signal and the imaginary part signal of the complex-number-type signal;
        transmitting the real part signal and the imaginary part signal to the double-sideband modulation module by using the dual-output DAC through two output ends of the dual-output DAC;
        performing modulation processing on the real part signal and the imaginary part signal by using the double-sideband modulation module, to obtain a double-sideband complex-number-type signal; and
        transmitting the double-sideband complex-number-type signal to the receiver by using the double-sideband modulation module through the optical fiber.

2. The signal transmitting method according to claim 1, wherein
    the signal transmitter further comprises a dispersion pre-compensator that is serially connected between the phase rotator and the electro-optic modulator, and the dispersion pre-compensator comprises a fast Fourier transformation (FFT) module, a dispersion pre-compensation module, and a first inverse fast Fourier transformation IFFT module that are connected in series;
    before the transmitting the complex-number-type signal to the receiver by using the electro-optic modulator through the optical fiber, the method further comprises:
        performing FFT processing on the complex-number-type signal by using the FFT module;
        performing, by using the dispersion pre-compensation module, dispersion pre-compensation processing on the complex-number-type signal on which the FFT processing has been performed; and
        performing, by using the first IFFT module, first IFFT processing on the complex-number-type signal on which the dispersion pre-compensation processing has been performed; and
    the transmitting the complex-number-type signal to the receiver by using the electro-optic modulator through the optical fiber comprises:

transmitting, to the receiver by using the electro-optic modulator through the optical fiber, the complex-number-type signal on which the first IFFT processing has been performed.

3. The signal transmitting method according to claim 1, wherein the double-sideband modulation module is an IQ Mach-Zehnder modulator (IQMZM), and the IQMZM comprises a first Mach-Zehnder modulator(MZM), a second MZM, and a third MZM;

the two output ends of the dual-output DAC are serially connected to the first MZM and the second MZM, the first MZM and the second MZM are connected in parallel, both the first MZM and the second MZM are serially connected to the third MZM, and the third MZM is connected to the receiver through an optical fiber; and each of a bias amount of a bias end of the first MZM, a bias amount of a bias end of the second MZM, and a bias amount of a bias end of the third MZM is $$\frac{\pi}{4}.$$

4. The signal transmitting method according to claim 3, wherein at least one of a linear driving amplifier or an attenuator is serially connected between each of the output ends and a modulator that is serially connected to the output end.

5. The signal transmitting method according to claim 1, wherein the double-sideband modulation module is a dual-driver Mach-Zehnder modulator (DDMZM), and the DDMZM comprises a first phase modulator PM and a second PM;

the two output ends of the dual-output DAC are serially connected to the first PM and the second PM, the first PM and the second PM are connected in parallel, and both the first PM and the second PM are connected to the receiver through an optical fiber; and both a bias amount of a bias end of the first PM and a bias amount of a bias end of the second PM are $$\frac{\pi}{4}.$$

6. The signal transmitting method according to claim 5, wherein at least one of a linear driving amplifier or an attenuator is serially connected between each of the output ends and a modulator that is serially connected to the output end.

7. The signal transmitting method according to claim 1, wherein the service data source comprises a pseudo-random binary sequence (PRBS) signal generation module, a mapping module, a series/parallel conversion module, a zero-fill module, a p-point IFFT module, a cyclic prefix adding module, and a parallel/series conversion module that are connected in series, wherein p is 2 raised to a power of q, and q is an integer greater than or equal to 1; and the generating the real-number-type signal by using the service data source comprises: generating 2m×n PRBS signals by using the PRBS signal generation module, wherein both m and n are integers greater than or equal to 1; performing mapping processing on the 2m×n PRBS signals by using the mapping module, to obtain mapping signals; performing series/parallel conversion processing on the mapping signals by using the series/parallel conversion module, to obtain 2m frequency-domain signals, wherein the 2m frequency-domain signals comprise m positive-frequency signals and m negative-frequency signals, and each of the m positive-frequency signals is conjugate to one of the m negative-frequency signals; performing zero-fill processing on the 2m frequency-domain signals by using the zero-fill module, to obtain p frequency-domain signals; performing p-point IFFT processing on the p frequency-domain signals by using the p-point IFFT module, to obtain p time-domain signals; adding a cyclic prefix to the p time-domain signals by using the cyclic prefix adding module, to obtain an anti-dispersion signal; and performing parallel/series conversion processing on the anti-dispersion signal by using the parallel/series conversion module, to obtain the real-number-type signal.

8. A signal transmitter, wherein the signal transmitter comprises a service data source, a phase rotator, and an electro-optic modulator that are connected in series, wherein the service data source is configured to generate a real-number-type signal;

the phase rotator is configured to perform phase rotation processing on the real-number-type signal to obtain a complex-number-type signal, wherein a value of a real part signal of the complex-number-type signal is equal to a value of an imaginary part signal of the complex-number-type signal; and the electro-optic modulator is configured to transmit the complex-number-type signal to a receiver through an optical fiber, wherein the electro-optic modulator comprises a dual-output DAC and a double-sideband modulation module that are connected in series, and wherein the electro-optic modulator is configured to transmit the complex-number-type signal to a receiver comprises:

the dual-output DAC is configured to process the complex-number-type signal to obtain the real part signal and the imaginary part signal of the complex-number-type signal;

the dual-output DAC is further configured to transmit the real part signal and the imaginary part signal to the double-sideband modulation module through two output ends of the dual-output DAC;

the double-sideband modulation module is configured to perform modulation processing on the real part signal and the imaginary part signal to obtain a double-sideband complex-number-type signal; and the double-sideband modulation module is configured to transmit the double-sideband complex-number-type signal to the receiver through the optical fiber.

9. The signal transmitter according to claim 8, wherein the signal transmitter further comprises a dispersion pre-compensator that is serially connected between the phase rotator and the electro-optic modulator, and the dispersion pre-compensator comprises an FFT module, a dispersion pre-compensation module, and a first IFFT module that are connected in series, wherein the FFT module is configured to perform FFT processing on the complex-number-type signal;

the dispersion pre-compensation module is configured to perform dispersion pre-compensation processing on the complex-number-type signal on which the FFT processing has been performed;

the first IFFT module is configured to perform first IFFT processing on the complex-number-type signal on which the dispersion pre-compensation processing has been performed; and the electro-optic modulator is configured to transmit, to the receiver through the optical fiber, the complex-number-type signal on which the first IFFT processing has been performed.

10. The signal transmitter according to claim 8, wherein the double-sideband modulation module is an IQMZM, and the IQMZM comprises a first MZM, a second MZM, and a third MZM;
the two output ends of the dual-output DAC are serially connected to the first MZM and the second MZM, the first MZM and the second MZM are connected in parallel, both the first MZM and the second MZM are serially connected to the third MZM, and the third MZM is connected to the receiver through an optical fiber; and
each of a bias amount of a bias end of the first MZM, a bias amount of a bias end of the second MZM, and a bias amount of a bias end of the third MZM is $$\frac{\pi}{4}.$$

11. The signal transmitter according to claim 10, wherein at least one of a linear driving amplifier or an attenuator is serially connected between each of the output ends and a modulator that is serially connected to the output end.

12. The signal transmitter according to claim 8, wherein the double-sideband modulation module is a DDMZM, and the DDMZM comprises a first PM and a second PM;
the two output ends of the dual-output DAC are serially connected to the first PM and the second PM, the first PM and the second PM are connected in parallel, and both the first PM and the second PM are connected to the receiver through an optical fiber; and
both a bias amount of a bias end of the first PM and a bias amount of a bias end of the second PM are $$\frac{\pi}{4}.$$

13. The signal transmitter according to claim 12, wherein at least one of a linear driving amplifier or an attenuator is serially connected between each of the output ends and a modulator that is serially connected to the output end.

14. The signal transmitter according to claim 8, wherein the service data source comprises a PRBS signal generation module, a mapping module, a series/parallel conversion module, a zero-fill module, a p-point IFFT module, a cyclic prefix adding module, and a parallel/series conversion module that are connected in series, wherein p is 2 raised to a power of q, and q is an integer greater than or equal to 1, wherein
the PRBS signal generation module is configured to generate 2m×n PRBS signals, wherein both m and n are integers greater than or equal to 1;
the mapping module is configured to perform mapping processing on the 2m×n PRBS signals to obtain mapping signals;

the series/parallel conversion module is configured to perform series/parallel conversion processing on the mapping signals to obtain 2m frequency-domain signals, wherein the 2m frequency-domain signals comprise m positive-frequency signals and m negative-frequency signals, and each of the m positive-frequency signals is conjugate to one of the m negative-frequency signals;
the zero-fill module is configured to perform zero-fill processing on the 2m frequency-domain signals to obtain p frequency-domain signals;
the p-point IFFT module is configured to perform p-point IFFT processing on the p frequency-domain signals to obtain p time-domain signals;
the cyclic prefix adding module is configured to add a cyclic prefix to the p time-domain signals to obtain an anti-dispersion signal; and
the parallel/series conversion module is configured to perform parallel/series conversion processing on the anti-dispersion signal to obtain the real-number-type signal.

15. A signal transmission system, wherein the signal transmission system comprises a transmitter, an optical fiber, and a receiver, wherein
the transmitter comprises a service data source, a phase rotator, and an electro-optic modulator that are connected in series, wherein
the service data source is configured to generate a real-number-type signal;
the phase rotator is configured to perform phase rotation processing on the real-number-type signal to obtain a complex-number-type signal, wherein a value of a real part signal of the complex-number-type signal is equal to a value of an imaginary part signal of the complex-number-type signal; and
the electro-optic modulator is configured to transmit the complex-number-type signal to a receiver through an optical fiber, wherein the electro-optic modulator comprises a dual-output DAC and a double-sideband modulation module that are connected in series, and wherein the electro-optic modulator is configured to transmit the complex-number-type signal to a receiver comprises:
the dual-output DAC is configured to process the complex-number-type signal to obtain the real part signal and the imaginary part signal of the complex-number-type signal;
the dual-output DAC is further configured to transmit the real part signal and the imaginary part signal to the double-sideband modulation module through two output ends of the dual-output DAC;
the double-sideband modulation module is configured to perform modulation processing on the real part signal and the imaginary part signal to obtain a double-sideband complex-number-type signal; and
the double-sideband modulation module is configured to transmit the double-sideband complex-number-type signal to the receiver through the optical fiber.

* * * * *